US008997474B2

(12) United States Patent
Lewry et al.

(10) Patent No.: US 8,997,474 B2
(45) Date of Patent: Apr. 7, 2015

(54) DIFFERENTIAL FLUID PRESSURE ENERGY CONVERSION SYSTEM

(76) Inventors: William Lewry, East Kilbridge (GB); Hazel Ann Whyte Lewry, East Kilbridge (GB)

( * ) Notice: Subject to any disclaimer, the term of this patent is extended or adjusted under 35 U.S.C. 154(b) by 1045 days.

(21) Appl. No.: 12/932,300

(22) Filed: Feb. 23, 2011

(65) Prior Publication Data

US 2011/0289910 A1 Dec. 1, 2011

Related U.S. Application Data

(60) Provisional application No. 61/396,967, filed on Jun. 5, 2010.

(30) Foreign Application Priority Data

Jun. 1, 2010 (GB) .................................. 1009114.8

(51) Int. Cl.
*F16D 31/02* (2006.01)
*F15B 3/00* (2006.01)

(52) U.S. Cl.
CPC ........................................ *F15B 3/00* (2013.01)

(58) Field of Classification Search
USPC .............. 60/369, 375, 398; 91/222, 224, 229; 415/916
See application file for complete search history.

(56) References Cited

U.S. PATENT DOCUMENTS 1,691,737 A * 11/1928 Pescara ......................... 417/341
3,079,900 A 3/1963 Hunnicutt
3,086,470 A * 4/1963 Skipor et al. .................. 417/225
5,983,638 A 11/1999 Achten et al.
2005/0042111 A1* 2/2005 Zaiser et al. ................. 417/225
2010/0058751 A1 3/2010 Chavez

* cited by examiner

*Primary Examiner* — Edward Look
*Assistant Examiner* — Daniel Collins
(74) *Attorney, Agent, or Firm* — Melvin K. Silverman

(57) ABSTRACT

A differential fluid pressure energy conversion system includes a valve (V1) for regulating an input from a pressure source to define a fluid flow; and a lower piston chamber (LPC) in fluid communication with an output of V1, the LPC disposed about a central vertical axis of the system; Further included is a double acting reciprocatable piston (DAP) having an integral lower portion (PI) and an integral upper integral portion (P2), each portion having a bottom radial surface area, the radial surface area of P1 greater than that of P2, an outer peripheral edge of the P1 in fluid-tight slidable continuous contact with an inner complemental surface of LPC, DAP further including an elongate axial channel, co-axial with the vertical axis of the system, the channel extending an entire axial length of the DAP. Also included is an upper piston chamber (UPC) disposed in vertical axial alignment with the system axis and without fluid communication with the LPC, an inner surface of the UPC in fluid-tight slidable continuous contact with a complemental peripheral edge of the P2 of the DAP. The system also includes a valve (V2) within the axial channel of the DAP, the valve effecting closure of the channel during each upstroke of the DAP and opening of the axial channel during each downstroke; and a fluid exit port in fluid communication with the UPC disposed above a greatest extent of upward travel of the DAP, the port permitting release, to an ambient atmosphere, during upward axial displacement of the DAP, of pressurized fluid injected through the axial channel into the UPC during downward axial displacement of the DAP when the valve V2 is open, whereby a ratio of pressure of the fluid in the UPC relative to that in the LPC is generally determined by the ratio of the lower radial surface area of P1 to that of P2.

30 Claims, 19 Drawing Sheets

DIFFERENTIAL FLUID PRESSURE ENERGY CONVERSION SYSTEM

REFERENCE TO RELATED APPLICATION

This application claim priority under 35 U.S.C. 119 to pending Great Britain Application No. 10009114.8, filed Jun. 1, 2010 and, further claims priority under 35 U.S.C. 119(e) to U.S. Provisional Application No. 61/396,967, filed Jun. 5, 2010, and the same is incorporated herewith in its entirety.

BACKGROUND OF THE INVENTION

1. Field of Invention

The present invention relates to a fluid-energy pump system using gravity vector pressure differentials which, more particularly, may be employed as an input to a hydraulic or pneumatic turbine using a source of fluid pressure, either hydraulic or pneumatic, which is greater than that of an ambient atmosphere within which the inventive system is disposed.

2. Description of Related Art

The instant invention builds upon principles first established by Pascal now known as Pascal's Law which states that: "A change of pressure of an enclosed incompressible fluid is conveyed undiminished to every part of the fluid and to the surfaces of its container." The present invention also relies upon the operation of Boyle's Law which describes the inversely proportional relationship between absolute pressure and volume of a fluid, if the temperature is kept constant within an enclosed system. Boyle's law is particularly applicable to the pneumatic (as opposed to hydraulic) embodiment of the inventive system as set forth herein. A significant function of the invention also occurs in accordance with Archimedes' Principle which sets forth that an object immersed of fluid is buoyed by a force equal to the weight of the fluid displaced by the object.

There exists a class of devices of the present generalized type known as hydram devices or hydraulic ram pumps. Such devices require dynamic flow of fluid, whereas the inventive system operates through a separation of static fluid pressures. In addition, hydram devices include no internal axial conduit flow of fluid between internal pressure differentials. As well, hydram devices require a fluid shockwave to create compression of air to result in usable lift or work, whereas the instant system can operate upon hydraulics alone to create necessary lifting forces or potential energy for other uses.

With respect to patents know to the inventor, U.S. Pat. No. 3,079,900 (1963) to Hunnicutt entitled Fluid Motor, is similar in broadest concept, however derives its operating pressures from conventional known pressure sources, rather than from the efficacies associated with the use of fluid at depths as in a reservoir, lake, ocean, tank or the like, and does not employ a gravity return cycle. Hunnicutt, as such, requires the mechanical assistance of a spring as well as externally supplied compressed air, the result thereof being but one productive stroke per cycle, as opposed to two productive strokes per cycle as taught in the invention herein.

As U.S. Pat. No. 5,983,638 (1999) to Achten et al, entitled Hydraulic Switching Valve and a Free Piston Engine Provided Therein, relates to a double acting piston, as does Applicant's system, however it relies upon fossil fuel as an input and, as such, produces waste products which themselves require management. In addition, an external power source is required for the control thereof. Achten, as well, does not make use of gravity for purposes of reset of its double acting hydraulic piston, and as such is limited in terms of its efficiency.

U.S. Patent Publication No. US 2010/0058751 (2010) to Chavez, entitled Reciprocating Pneumatic Piston Gravity Engine requires, as do Hunnicutt and Achten, springs, or opposing springs, integral to the designs thereof. As such, the gravity reset function applicable to the present invention is not present, nor is differentiation of cylinder size as a functional requirement to take advantage of Pascal's and Boyles Laws. Chavez as well lacks a central fluid conduit with a gravity vector actuated connecting rod. Further, the operating media of Chavez is pneumatic, with no apparent reference to a hydraulic capability.

China Published Patent Specification CN 0028118 (1999) to Liu, entitled Hydro Energy Pump requires an internal elastomeric component to supply or aid in the reset function and indicates required derivation of its energy source from an upper reservoir which the instant invention does not require, nor are functional gravity reset and an internal conduit within the connection methods between the pistons present. Further the system detailed by Liu has one energy deriving stroke in each cycle, whereas the invention detailed herein has two, comprising a pressure stroke and a displacement stroke.

The present invention therefore represents a distinct advantage over all art of record relative to fluid pressure differential energy conversion systems.

SUMMARY OF THE INVENTION

A differential fluid pressure energy conversion system includes a lower piston chamber (LPC) including, in a lower region thereof, a valve (V1) for regulating fluid input to said LPC from a defined pressure source having a pressure greater than that of an ambient atmosphere, said LPC disposed in axial alignment about a central vertical axis of said system including an upper base of said LPC disposed about said system axis. The system also includes an intermediate piston chamber (IPC) disposed in vertical axial alignment with the system axis and having fluid communication with said LPC through an opening in a lower base of said IPC disposed oppositely an opening in said aperture in said upper base of said LPC; and an upper piston chamber (UPC) disposed in vertical axial alignment with the system axis, a lower base of said UPC having an aperture therein opposing an aperture in an upper base of said IPC; The system yet further includes a double-acting reciprocatable piston (DAP) having an integral lower piston head (P1), operable within said LPC, an integral, intermediate piston head (P2) operable within said IPC, and an integral upper piston head (P3) operable within said UPC, each of said P1, P2 and P3 having a lower radial surface area in which an aggregate lower radial surface area of P1 is greater than that of an aggregate lower surface area of P2 and P3. Outer peripheral edges of each of P1, P2 and P3 are in fluid-tight slidable continuous contact with inner complemental surfaces of said LPC, IPC and UPC respectively. Lower and intermediate portions of said DAP include an axial channel having an elongate axial rod co-axial with said vertical axis of the system, said channel and rod extending between said LPC and said IPC. A downwardly directed flared opening of said axial channel is located within said P1, having a diameter greater than that of upper portions of said axial channel within and between said LPC and IPC. The system further includes a valve (V2) within said axial channel of said DAP, said valve effecting selectable closure of said channel, inclusive of said flared opening, during each upstroke of said DAP, and opening said axial channel during each downstroke of said DAP, said V2 integrally including said axial rod within said axial channel. A fluid exit port in fluid communication with said IPC is disposed above a greatest extent of travel of said DAP, said port permitting release therethrough, to said ambient atmosphere, during upward axial displacement of said DAP, of pressurized fluid injected through said axial channel into said IPC during downward axial displacement of said DAP, whereby the ratio of pressure of said fluid in said IPC relative to that in said LPC is generally determined by the ratio of a lower radial surface area of P1 to that of P2.

It is an object of the invention to provide a system for using gravity vector associated fluid pressure differentials to increase the potential energy of fluid at the lowest of such differentials and, as desired, translating such potential energy into usable power.

It is a further object to employ said system as a pump.

It is another object to employ said system as a compressor.

It is a yet further object of the invention to provide such a system in which one or more of said fluid pressure differentials may be artificially supplied by an external power source.

The above and yet other objects and advantages of the present invention will become apparent from the hereinafter set forth Brief Description of the Drawings, Detailed Description of the Invention, and Claims appended herewith.

DETAILED DESCRIPTION OF THE INVENTION

The present invention relates to the use of differences in fluid pressure, along respective points of the same gravity vector by which differentials in energy, both potential and kinetic, may be released between such fluid pressure differentials.

The term barometric, as used herein, includes the effect of atmospheric pressure, applied to a body of water such as a reservoir. However, it is to be understood that the instant invention is equally applicable to environments having no atmosphere whatever as long as there exists a gravity vector sufficient to create significant differentials in fluid pressure as a function of a depth of the volume or column of liquid, for example, within a primary reservoir or equivalent means capable of producing a pressure source at a first input to the system, as described below. Alternatively, such pressure source may be artificially provided, as by a compressor having an independent power source.

Figure 1:
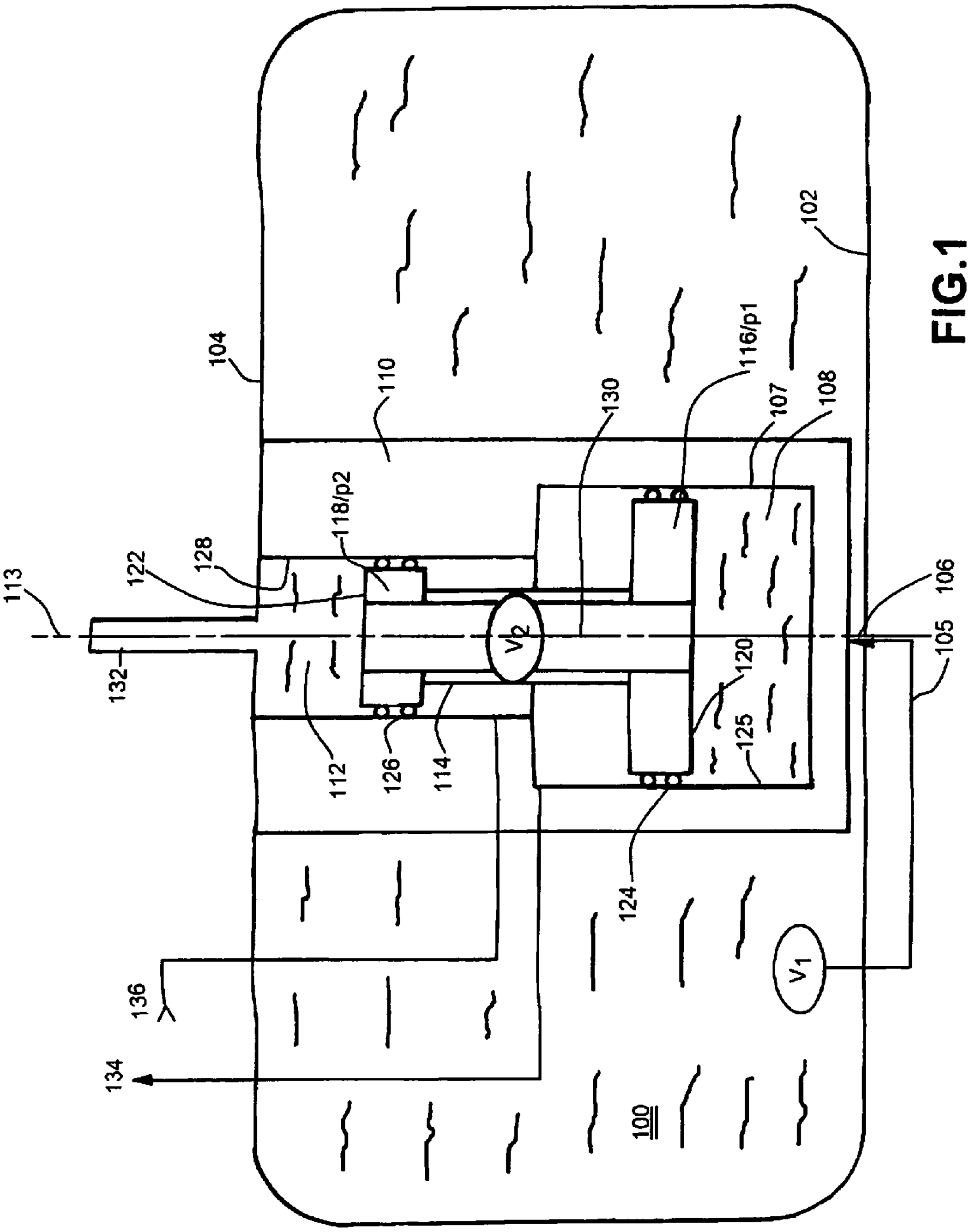
FIG. 1 is a conceptual, static view of a first embodiment of the present invention.

In FIG. 1 are shown the operative elements of the present system at a conceptual level. More particularly, in FIG. 1 is shown a primary reservoir 100 comprising a body of water in which the pressure at depth 102 of reservoir 100 is a function of a barometric pressure at surface 104 plus the gravimetric pressure attributable to the effect of gravity upon reservoir 100 at the bottom 102 thereof. It is understood that the use of reservoir 100 is not an inherent aspect of the instant invention in that, in lieu thereof, any pressure source, even if artificially created, as through use of a pump or compressor may, in a given application be satisfactory for the operation of the inventive system in the embodiments set forth herein.

In further regard to the embodiment of FIG. 1, there is shown a valve V1 situated near the bottom of reservoir 100 preferably at a depth of about 100 meters, the pressure thereat being about 10 bar (that is, ten barometric pressures or ten times the pressure at surface 104). 10 bar therefore equates to about 142 psi. Valve V1 controls or regulates the pressure source 105, at an input 106 from the pressure source to define a fluid flow into a lower piston 107 and lower piston chamber (LPC) 108. In FIG. 1, piston block 110 is provided with both said LPC 108 and with an upper piston chamber (UPC) 112.

Axially located along a vertical axis 113 of the instant system is a double acting reciprocatable piston (DAP) 114 having an integral lower portion (P1) 116 and an integral upper portion (P2) 118. Each portion P1 and P2 of the DAP is characterized by a respective radial surface areas 120 and 122 in which the radial surface area 120 of P1 must be greater than the radial surface area 122 of P2. This relationship is essential to the principles of operation of the present invention in that Pascal's Law dictates that the multiplication of fluid pressure will occur when an incompressible liquid, in the present example of water, is transferred into a controlled-contiguous but confined volume of lesser size. Pascal's Law enables numerous applications in modern society including the Well-known automobile lift used in garages whereby a technician, by simply applying the pressure of the human foot to a large surface area of a double acting piston filled with an hydraulic fluid, may cause sufficient multiplication of hydraulic pressure in a smaller upper cylinder of the car lift sufficient to enable the car to be lifted after the actuation pedal has been reciprocated only a few times by the technician. Hydraulic brakes are another common application of this principle.

To assure hydraulic integrity of the elements of this (or any) hydraulic system, outer peripheral edge of P1 must be provided with seals, gaskets or the like 124 sufficient to ensure a fluid-tight continuous slidable contact with an inner complemental surface 125 of said LPC 108 of the system. Similarly, upper integral portion 118 (P2) of the DAP 114 must be provided with suitable seals or gaskets 126 to ensure fluid-tight slidable continuous contact between its peripheral edge and inner complemental surface 128 of upper piston chamber (UPC) 112. As may be noted in FIG. 1, UPC must be disposed in vertical axial alignment with the system axis 113 but without direct fluid communication with the lower piston chamber 108 to avoid loss of multiplication of fluid pressure within UPC 112. As may be further noted with reference to FIG. 1, DAP 114 is particularly characterized by an axial channel 130 in which is disposed a valve V2, the function of which is to effect closure of channel 130 during each upstroke of the DAP 114 and the opening of channel 130 during each downstroke thereof. In other words, as is more fully described below, with V1 open, a fluid pressure 105 is provided to entry point 106 to LPC 108, this requiring that V2 be closed to enable the upward movement of DAP 114 and the desired resultant hydraulic compression within UPC 112. Conversely, V1 must be closed while V2 is open to accomplish the downward reciprocation of DAP 114 to its re-start position.

As may be further noted in FIG. 1, there is provided an axial fluid exit port 132 which is in fluid communication with said UPC 112 and also disposed above the greatest extent to upward travel of the DAP 114, said port permitting release therethrough, during upward axial displacement of the DAP, of pressurized fluid injected through said axial channel into said UPC 112 during upward axial displacement of the DAP when said valve V2 is opened. With V2 closed ratio of pressure of fluid in the UPC 112 relative to that in said LPC 108 is generally determined by the ratio of said lower surface area 120 of P1 to that of the upper surface area 122 of P2, or any potential combination of upper surface areas.

Further shown in FIG. 1 is vent line 134 which provides positive pneumatic pressure from P1 when DAP is elevating, and pneumatic line 136 from P2 which provides pneumatic suction when DAP is elevating. The opposite the case when DAP is moving downward when V2 is opened with DAP moving toward its reset position.

Figure 2:
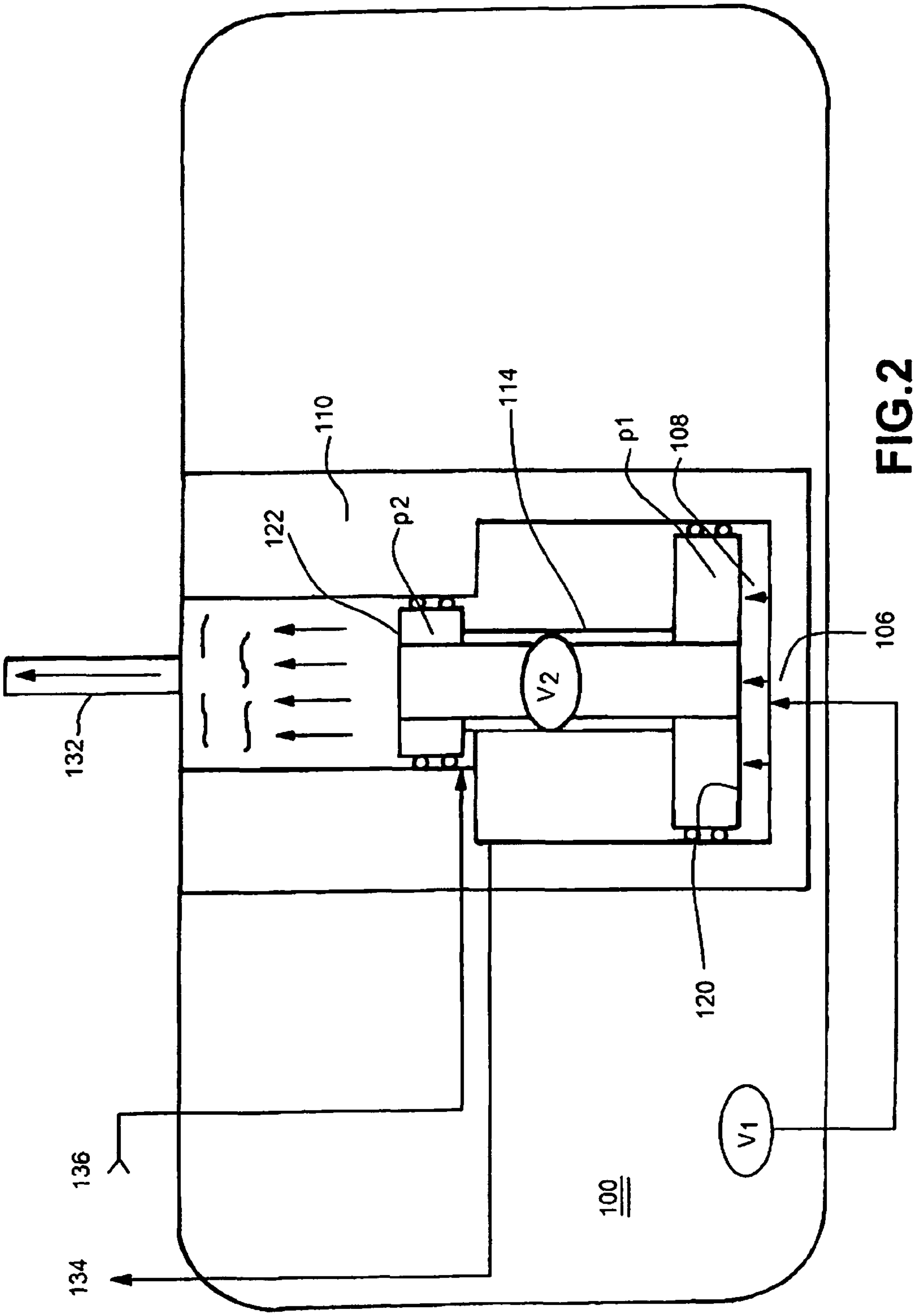
FIG. 2 is a view of the embodiment of FIG. 1 showing however the initiation of the power stroke of the embodiment.

With reference to FIG. 2, there is shown the start of the pressure or power cycle of the present system. Therein, the double acting piston 114 is shown a lower position so that filling of LPC 108 can occur when V1 is opened. During this period, DAP will move upward since the pressure at surface 120 is about 3 relative bars (caused by the weight, area of P1 and reactive pressure on P2) while the input or injection pressure at pressure source 106 will be about 10 bars. P1 will thus elevate at around 7 bars of pressure. It is further contemplated that the area of bottom 120 of piston P1 will be about three times the area of the top 122 of piston P2.

Figure 3:
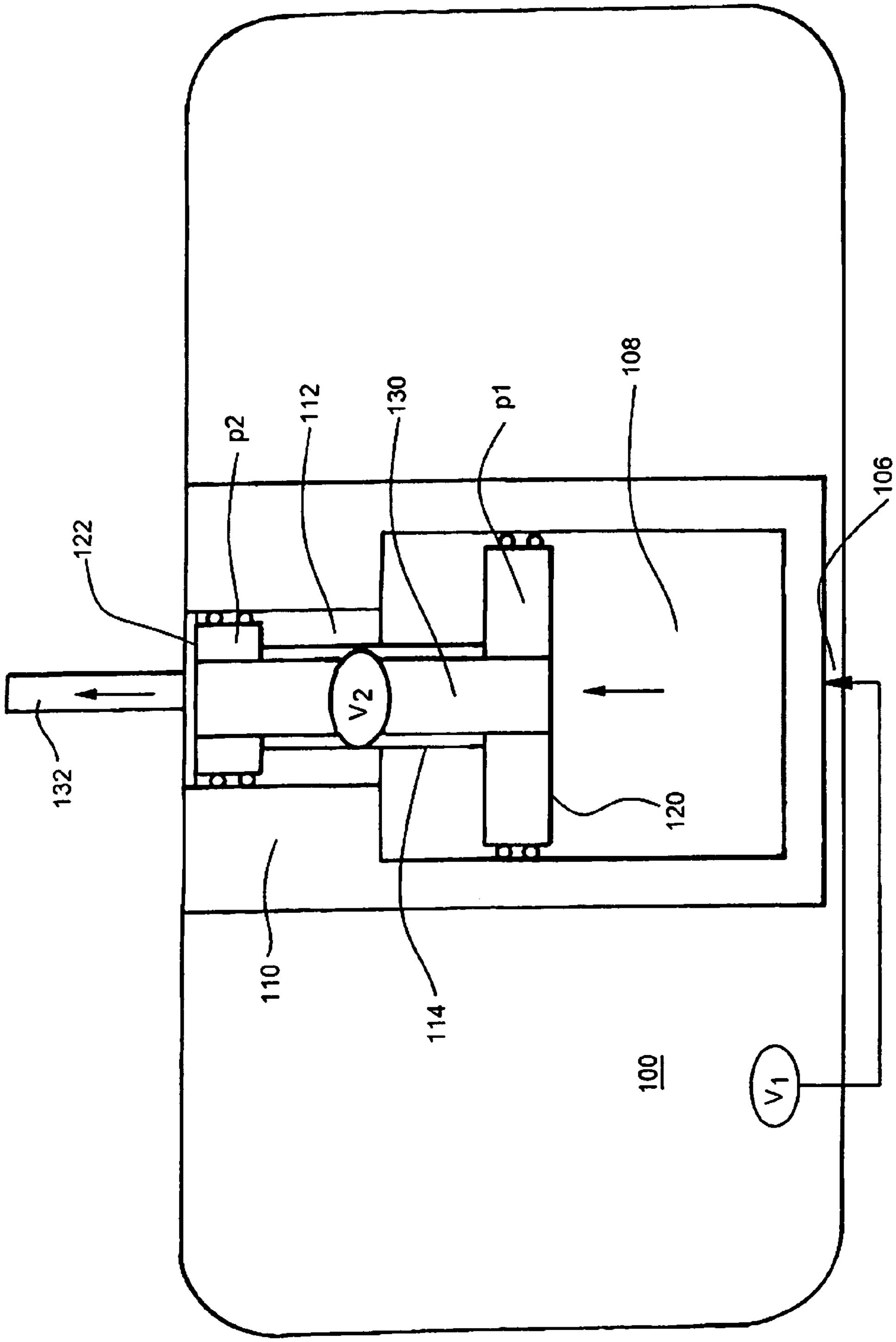
FIG. 3 is a further view of the embodiment of FIGS. 1 and 2 showing its approach to the top of the power stroke thereof.
Figure 4:
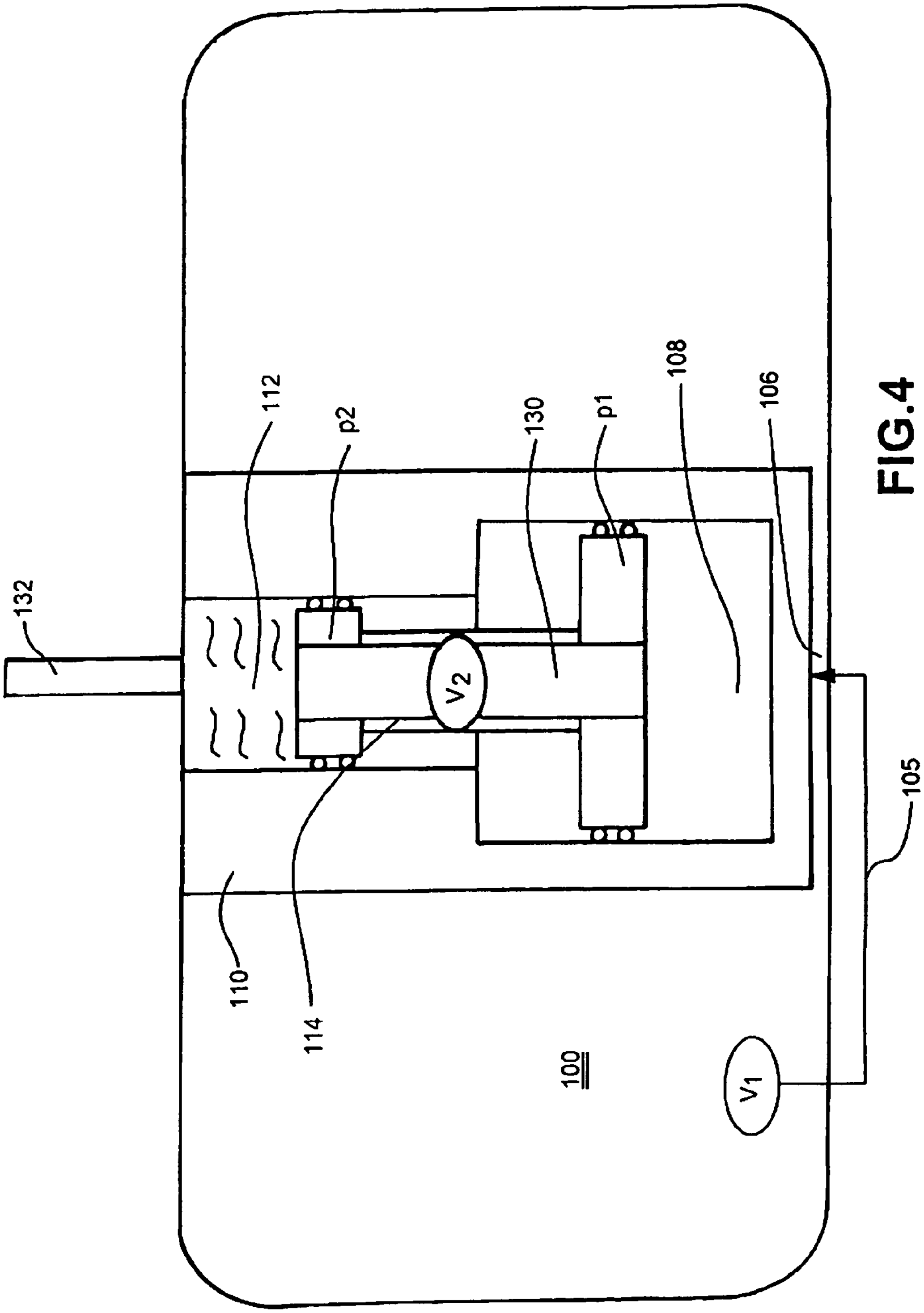
FIG. 4 is a further schematic view of the embodiment of FIGS. 1-3, however showing a midway point in the reset stroke thereof. (should the arrow indicating flow to the device from V1 be removed and replace with an arrow showing flow through the conduit?)

Shown in FIG. 3 is the stasis, or switchover point, between the power stroke and the re-set stroke, shown in FIG. 4. In FIG. 3, both valves V1 and V2 are closed, creating an equilibrium point. However, to initiate the reset cycle, V2 must be open while V1 is closed, thereby equalizing fluid pressure between the UPC 112 above surface 122 and LPC 108 below 120. In the absence of any pressure differential between the UPC and LPC, the gravimetric weight of DAP 114 will readily overcome hydraulic friction within the LPC 108 thereby creating a displacement cycle until the re-start or start of the power stroke shown in FIG. 2 is again reached.

In summary, in order for the system of FIG. 1-4 to function, there must be provided a pressure source 106 from other primary reservoir 100 surrounding the piston block 110 or an artificial source such as a compressor or pump.

It is to be appreciated that, in a preferred embodiment, P1 and P2 define substantially cylindrical geometries in which of the radius P1 is outwardly concentric relative to that of P2. However other geometries, such as an ovoid, may be employed.

The above system displays its greatest efficiency with water or a hydraulic fluid is provided to LPC 108 and UPC 112. Under these conditions, maximum multiplication of fluid pressure is dictated by Pascal's Law relative to the properties of incompressible liquids. However, importantly, the present system is, as well, functional with respect to pneumatic fluids and hybrids thereof used at LPC and UPC respectively, in that after a certain degree of compression, the properties of a compressed gas will sufficiently resemble those of an incompressible liquid for purposes of functionality of the invention as set forth herein, as dictated by Boyle's Law.

With reference to FIGS. 5-8, there is shown a further embodiment 200 of the system of FIGS. 1 to 4, the primary difference therebetween lying in the geometry and mechanics of DAP 214 thereof. More particularly, with regard to the common elements, it is noted that the embodiments of FIGS. 5-8, like that of FIGS. 1-4, include a LPC 208 and a UPC 212 (see cross-sectional breakaway view of FIG. 5). For simplicity, the reservoir and pneumatic lines are not shown in FIGS. 5 to 8 as their use is optional. That is, the embodiment of FIGS. 5-8, as contemplated, will more likely be used in applications in which input 206 to LPC 208 is provided by a non-reservoir source such as mechanically pressurized water or gas at pressures of between 1 and 50 bar.

Figure 6:
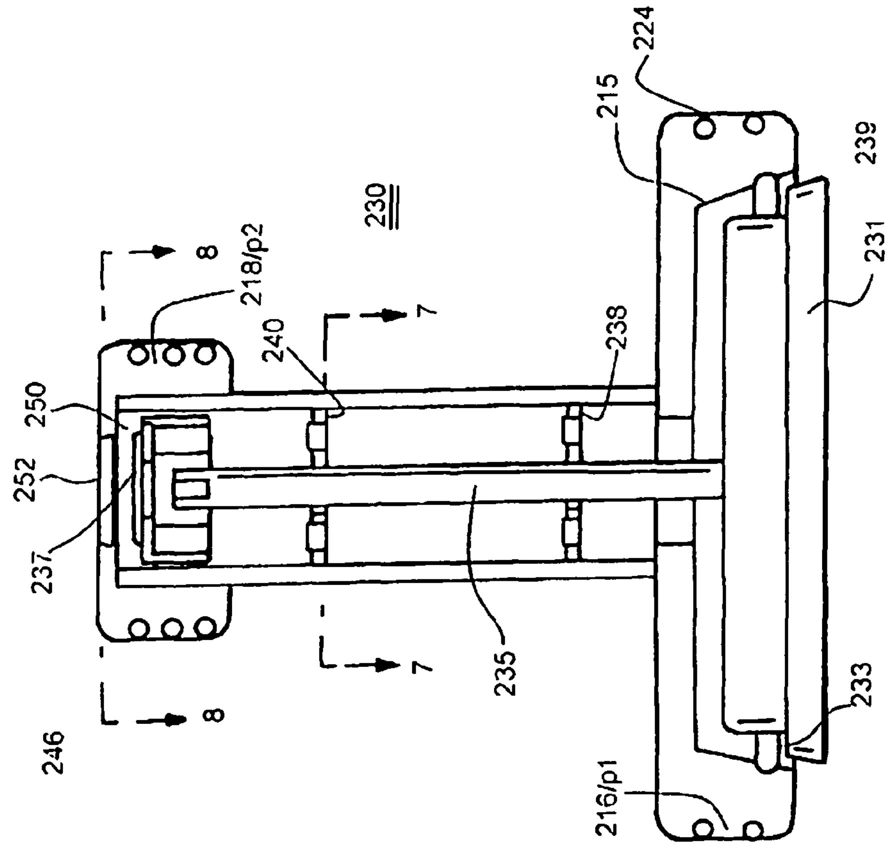
FIG. 6 is an enlarged view of the double acting piston of FIG. 5 and of V2 reset valve associated therewith.
Figure 5:
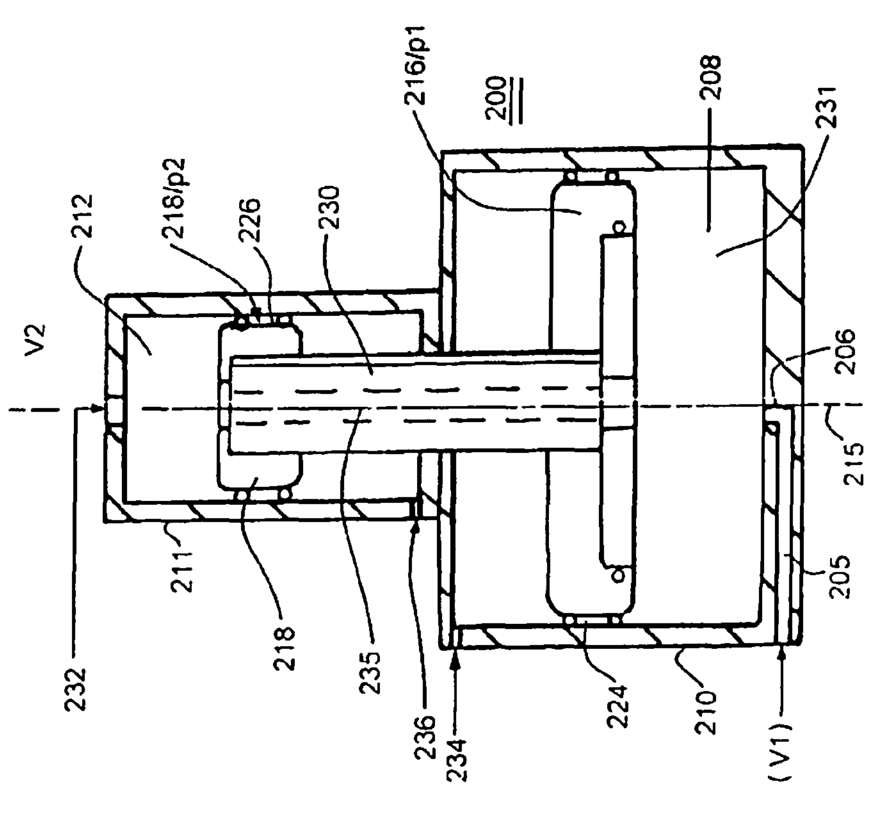
FIG. 5 is a view of a further embodiment of the invention of FIGS. 1-4, however showing the use of a different structure for the reset valve or assembly of the system.

With particular reference to V2 assembly 230, the assembly is seen to include a vertical rod 235 which extends to a horizontal pancake like closure plate 231 (more fully shown in FIG. 6). More particularly, FIG. 6 sets forth a cut-away view of the entire V2 assembly 230 which, therefrom, may be seen to include a vertical rod 235 and said pancake-like plate 231 which is complementally disposed within substantially trapezoidal-like recess 215 at the lower surface of lower piston 216 (P1). Further shown therein are P1 seals, seal 224 corresponding to seals 124 of the embodiment of FIGS. 1-4. Further shown in FIG. 6 are seals 233 which are placed upon shoulder 239 of the V2 closure plate 231.

Figure 7:
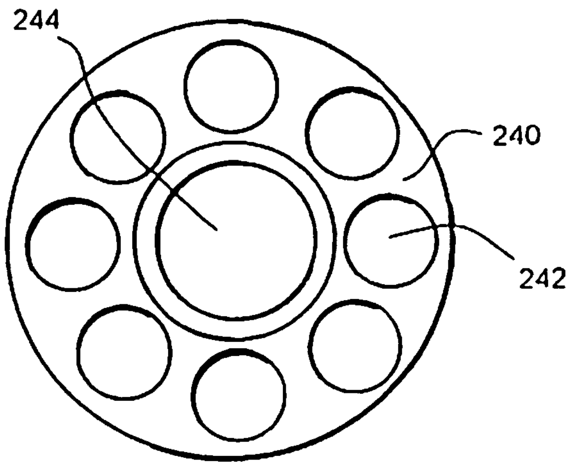
FIG. 7 is a radial cross-sectional view of a gasket (combined fluid conduit & guide) taken through Line 7-7 of FIG. 6.
Figure 8:
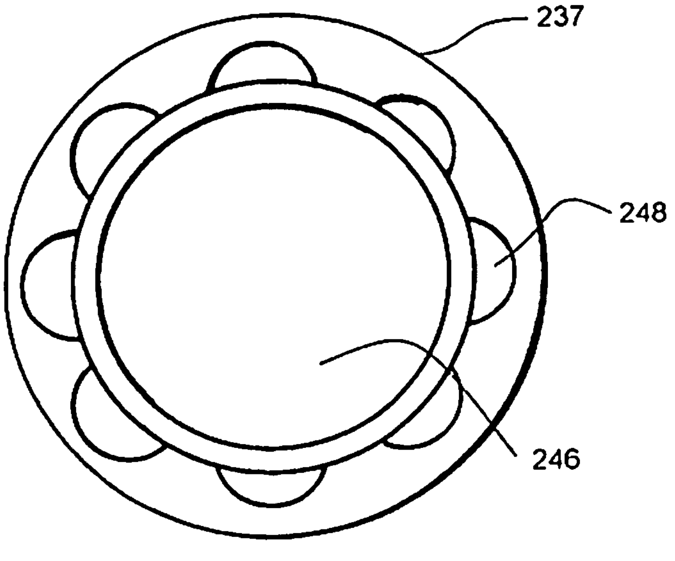
FIG. 8 is a radial cross-sectional view taken through Line 8-8 of FIG. 6.

Internally parts of V2 assembly 230 are shown in FIGS. 6-8. Therein, fluid flows thru lower fluid flow channeling guide 238 and upper fluid flow channeling guide 240 as well as upper cylindrical part 237 of the V2 assembly 230. The internal geometry of upper and lower guides 238 and 240 may be more fully appreciated with reference to the view of Line 7-7 of FIG. 6 which is a radial cross-sectional view of the upper guide 240. See FIG. 7. Therein hole 244 is provided to permit selective reciprocation (below described) of vertical rod 235 through the guide 240 and with it, the entirety of the V2 assembly. Disposed in planetary relationship an opening 244 is a plurality of circumferentially disposed holes 242 which affords water flow upwardly through the center of V2 when V2 plate 231 is in an open position. Similarly, as may be noted in the radial cross-sectional view of FIG. 8, upper portion 237 of the V2 assembly 230 (see also FIG. 6) is a substantially cylindrical element characterized by a wide upper face 246 and a radial periphery vertical planetary apertures 248 which virtually conclude in a semi-circular exit points to uppermost region 250 (see FIG. 6) of the V2 assembly 230.

The salient mechanics of the above-described geometry and function of the V2 assembly is that plate 231 is forced to close after the V2 valve has moved upward within the geometry shown in FIG. 6 until plate 246 of upper portion 237 (see FIG. 6) have mated with complemental recess 252 at the top of piston 218 (P2). When this occurs, closure plate 231 is fully mated with trapezoidal recess 215 of piston 216 (P1) of the DAP assembly 230. The opening of plate 231 at the beginning of the re-set stroke is effected through the provision of sufficient external pressure through port 232 of UPC 212 (see FIG. 5) from the pressure source or other means, with the entire DAP reaches the re-start position shown in FIG. 2 whereupon plate 201 is closed by the fluid flow from pressure source 206 and/or contact with the lower surface of LPC 108.

In a further embodiment 300 of the present invention (see FIG. 9-10) there may, between LPC 308 and UPC 312 be provided an intermediate chamber (IPC) 309. Therein, water is typically employed to the upper and lower chambers while air or another gas such as Freon is employed within IPC 309. The embodiment of FIGS. 9-10 thereby differs from that of the prior embodiment in its use of a third or supplemental piston 320 between piston 316 and 318. Therein, intermediate cylinder or IPC 309 is fed by P5 (conduit 336) drawing air or other gas in through a one-way valve V3 at atmospheric or other pre-defined pressure during the downstroke of the entire DAP 314 while discharging the same air or gas, but under compression, through the same port P5 using the one-way valve V4 and therefrom into an external accumulator 370 (see FIG. 10). Surface 327 is a partition between upper and lower parts of IPC 309. Water pressure is fed in through Port 1 and valve V1 (see lower left of FIG. 9) causing the entire piston assembly to rise wherein liquid or gas is discharged back to accumulator 370 by the action of piston 320. Compressed gas or pressurized fluid is thus delivered by piston 320. Thereupon V2 (in vertical conduit 330) opens and fluid below is discharged by displacement back to water reservoir tank 377. See FIG. 10. Thereupon piston 316 settles and draws in a fresh atmospheric charge through P5 (conduit 336). Therein, P2 and P3 remain open to atmospheric pressure.

Resultant of the above, radial conduit 336 (associated with P5 and V3), exterior of intermediate chamber 309, will carry a second working fluid or gas, different from said fluid, typically water, within chambers 308 and 312, into the intermediate chamber 309 where it is subjected to compressive forces from the upper surface of piston 314 against chamber 309. This will effect reciprocating pressure cycle strokes against the compressible fluid, air or Freon, provided by V3 through line 336, causing a cyclical pressurized discharge therefrom by way of chamber 309 through conduit 336 and to accumulator 370.

Figure 10:
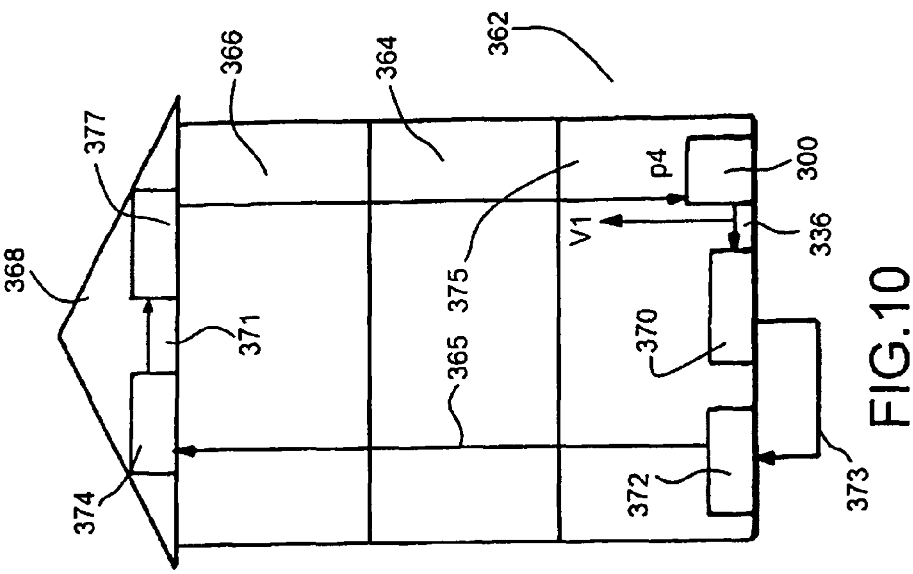
FIGS. 9-10 are views of a further embodiment of the present invention in which a gaseous intermediate chamber is used between upper and lower hydraulic chamber to produce a compressor usable in various commercial applications.
Figure 9:
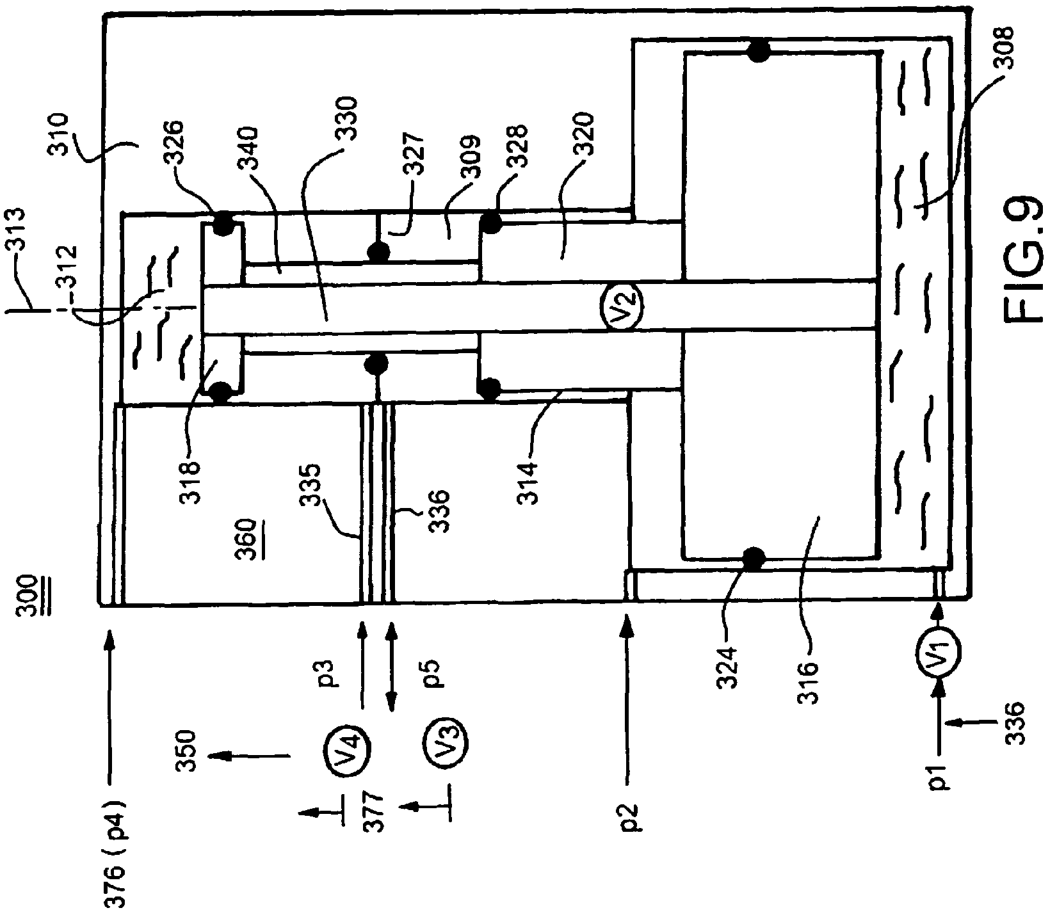

The application of the principles of the embodiment of FIG. 9 to that of a three-story residential or commercial structure is shown in FIG. 10 which, more particularly, includes a basement 362, a ground floor 364, an upper floor 366, and a roof 368. Shown in basement 362 is the system 300 of FIG. 9, which outputs to an appropriately sized accumulator 370, thru line 336, which in turn outputs to a heat pump 372 thru line 373.

The heat pump, as may be noted, receives sufficient compression from accumulator 370 to lift the working fluid thereof, typically a Freon or antifreeze, to roof 368 where a turbine and generator 374 may be located and are sufficient, thru conduit 371, to heat water tank 377 of, typically, sufficient size at least to provide hot water heating to a three-story residential structure with electric power to residential appliances off of turbine 374.

Fluid of IPC 309 under the pressure or compressive stroke is used to feed fluid to accumulator 370 for driving a turbine or other device thru heat pump 372 by means of conduit 365 to turbine generator 374. Under the displacement (upward) part of the cycle the majority of the fluid contained in the LPC 308 to an elevated water reservoir tank location 377 for resupply to LPC 308 by P1/V1 together with discharge fluid from turbine generator 374, it being slightly elevated of tank 377 under ideal conditions.

That is, in a standard domestic house system, capable of utilizing Freon or anti-freeze as the liquid medium, an operational head pressure P4 (see FIGS. 9 and 10) is created through the difference between the height of the attic space and that of the basement, i.e., typically 30 feet. At 14 pounds per square inch (1 bar) at a 2.5:1 amplification ratio applicable to the hydraulic amplification of unit 300, the output to an accumulator 370 (typically 2.5 bar) will require a Y valve V3 (see FIG. 9) in the fluid circuit between the tank 377, unit 300 and output 336 (P5) to permit the displacement portion of the cycle to also discharge back into the reservoir tank 377 and the pressure portion of the cycle to be directed to 374. This is indicated by the two-way arrow at P5 in FIG. 9. In effect if the hydraulic medium is distributed within a device nominally referred to as a coil with the return to 300 (P1/V1) managed by a subterranean route rather than directly, the fluid will act as a “heat sink” or “heat source” and may be utilized to supplementally pre-heat or pre-cool the structure.

The HVAC air moving equipment may also be actuated either by the fluid delivery or fluid return aspects of the cycle of 300, though it is envisaged most may utilize a turbine driven through the displacement cycle. The displacement cycle may be enhanced by use of a pressure reset enhancement component as in 375 (see FIG. 25) whereby component 420 provides supplemental reset pressure. See FIG. 11.

Figure 11:
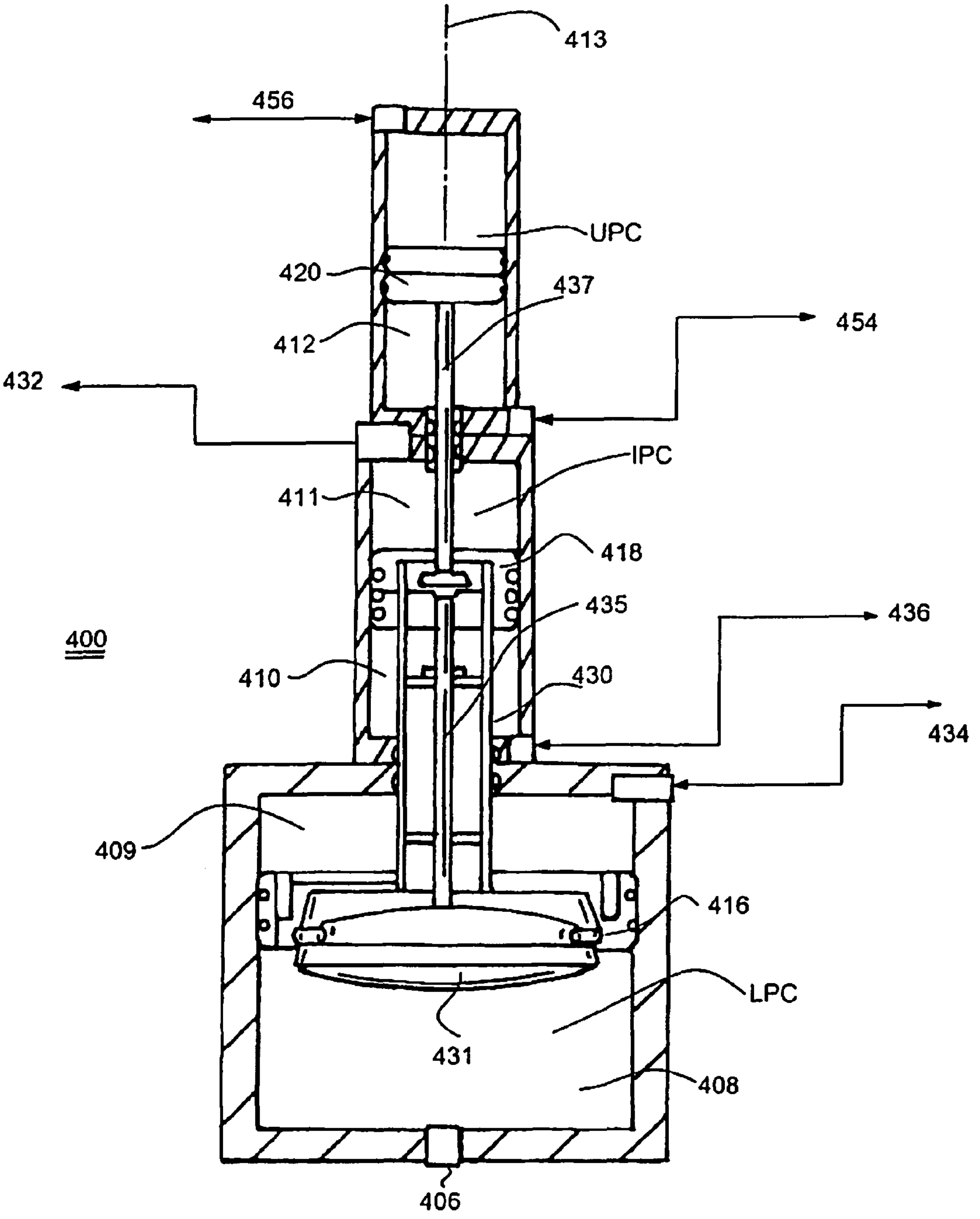
FIG. 11 is a vertical schematic cross-sectional view of a fourth embodiment of the present invention which employs a third cylinder as well as a third piston associated therewith.

With reference to the views of FIGS. 11 thru 25, there is shown a further embodiment 400 of the invention which, as in those embodiments described above, constitutes a differential fluid pressure energy conversion system. This (see FIG. 11) includes a lower pressure chamber (LPC) which in the present embodiment includes a lower region 408 and an upper region 409. At a radial bottom 425 of portion 408 is a valve V1, also referred to herein as valve 406 (and more fully described below). The regulation of fluid flow into the LPC from the defined pressure source having a pressure greater than that of an ambient atmosphere within the structure 400 shown in FIG. 11. As may be noted, as in the above embodiments, the LPC is disposed in axial alignment about a central vertical axis 413 of the system and includes an upper base 422 of the LPC also disposed about said system axis. With further reference to FIG. 11, there is shown an intermediate chamber (IPC), having regions 410 and 411, disposed in vertical axial alignment with the system axis and having fluid communication with said LPC through a lower base 460 of said IPC disposed oppositely to opening 462 in said upper base 422 of said LPC. See FIG. 11.

There is further provided an upper piston chamber 464 disposed in vertical axial alignment with the system axis 413, a lower base 466 of said UPC having an aperture 468 therein and an opposing aperture 470 in upper base of said IPC region 411.

As in prior embodiments, there is also provided a double-acting reciprocal piston (DAP) having a lower piston head P1 or 415, said DAP operable within said LPC. The DAP of the present embodiment includes integral intermediate piston head P2 or 418 and an integral upper piston head P3 or 420, each of said P1, P2 and P3 having a lower radial surface area. The radial surface area P1 is greater than the surfaces area of P2 and P3 combined. Outer edges of each of P1, P2 and P3 are in fluid-tight and continuous contact with inner complemental surfaces of said LPC, IPC and UPC respectively.

Lower and intermediate portions of said DAP define an axial channel 430 having therein an elongate axial rod 435 co-axial with the vertical axis of the system, said channel 430 and rod 435 extending between said LPC and said IPC. At the downward most end of said channel, piston P1 or 415 is reached and said channel 430, at that point, flares radially outwardly, (see FIG. 14) to a diameter greater than that fluid of the axial channel 430 thereabove. Disposed within axial channel 430 is valve (V2) which effects a selectable closure of said channel (inclusive of said flared opening) by upward movement of plate 431 during each upstroke of said DAP and of the opening of said axial channel during each downstroke as plate 431 is opened. Said rod 235 operates in tandem with piston P3 or 430 as is more fully described below.

Figure 14:
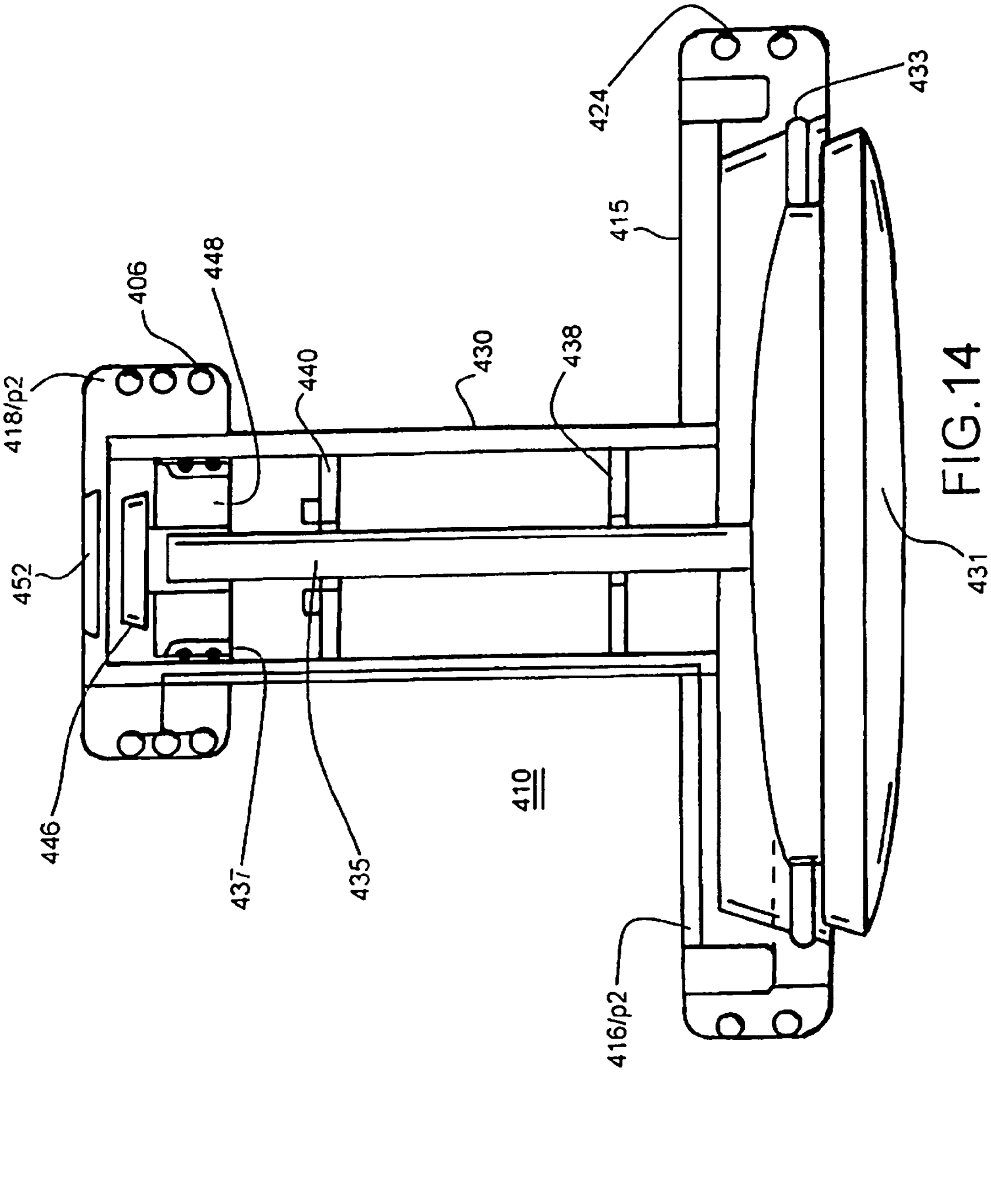
FIG. 14 is an enlarged view of the V2 reset valve and associated first piston, second piston, and fluid channel therebetween an including the axially disposed rod rigidly connecting a lower plate of V2 to an upper cylindrical portion thereof located within the fluid channel joining the lower and middle pistons of the system.

Fluid exit port 432, also referred to herein as Port 4, is disposed above the greatest extent of travel of the DAP, that is, the greatest extent of upward travel of piston P2 or 418 shown in FIGS. 11 and 14. Said Port 4 permits release therethrough, to ambient atmosphere, during upward axial displacement of the DAP of hydraulic fluid while hydraulic fluid is injected from Port 456, also referred to as Port 6, of the region 417 of the UPC.

It is noted that the ratio of pressure of fluid in said IPC relative to that in said LPC are generally determined by the ratio of lower radial surface is of P1 to that of upper radial surface of P2. It is noted that in an upper portion 417 of said UPC located above the greatest upward extent of travel of piston P3 or 420 is said Port 6, which is in fluid communication with pressure source at V1 or an alternate pressure source to assist in a reset function of V2 when during opening of V2 during each downstroke of the DAP.

In a manner, similar to that shown in FIG. 1, the embodiment of system 400 is submersed within a primary reservoir 475 in order to provide a pressure source to V1 at an established depth within the reservoir. See FIG. 25. Alternatively, such pressure source may be provided by other means such as a compressor. It is to be appreciated that an assist of the downstroke of the DAP may also be accomplished through a fluid communication at Port 6 with an upper reservoir 485 located gravitationally above said lower reservoir 475 or in direct fluid connection with said lower reservoir. See FIG. 5.

Figure 12:
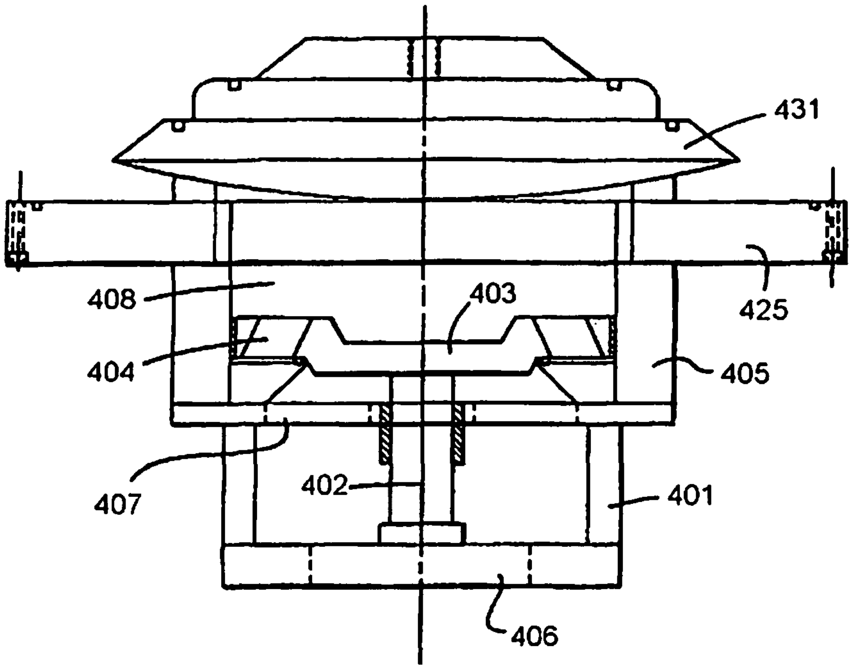
FIGS. 12 and 13 are views of V1 (the pressure source input) valve of the present system showing the source input valve in closed and open positions respectively.
Figure 13:
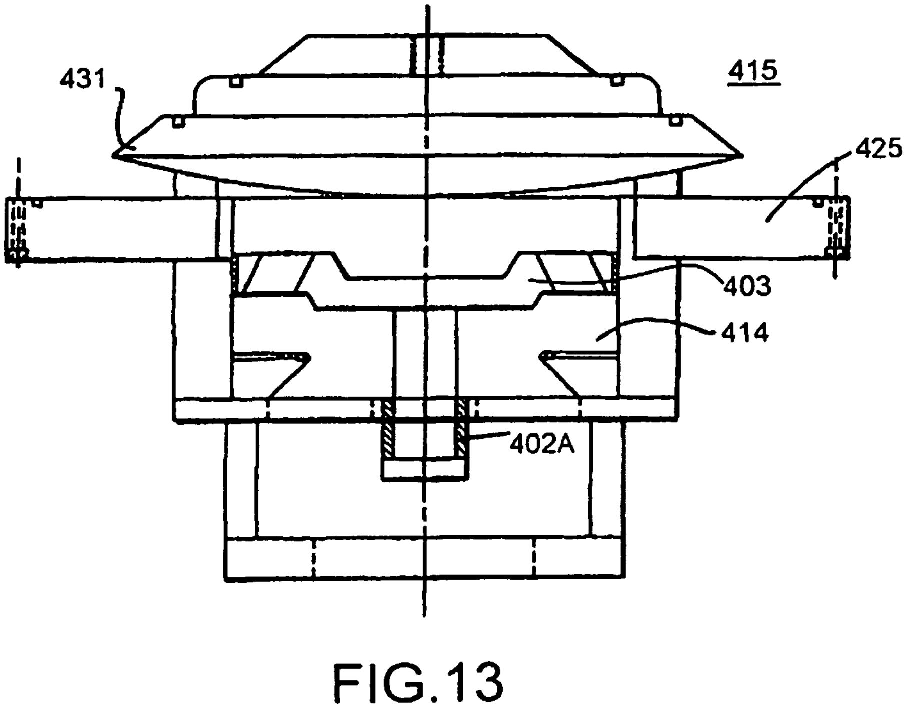

In FIGS. 12 and 13 is shown one manner in which V1 or opening 406 (Port 1) may be configured to moderate and focus the fluid impact from the pressure source at convex lower surface of plate 431 which, as above described, is attached at the bottom of vertical rod 435 of the DAP. Plate 431 is substantially complemental in geometry to recess 433 within the bottom of piston P1 or 415. See FIG. 11.

More particularly, in FIGS. 12 and 13, there is provided an axial rod 402 upon which is mounted a circumferential plate 430 which is provided with a plurality of apertures 404, the radial cross-section of which may be that of a plurality of ovals. However, in the vertical diametric cross-sectional view of FIGS. 12 and 13, openings [414] are shown substantially uniform, tilted openings. Guide 402A affords ease of reciprocation of the V1 assembly within plate 407 of the V1 assembly. The upward extent of travel thereof is shown in FIG. 13 from which it may be seen that plate 403 achieves a stop when in contact with lower surface 425 of the LPC 409. Conversely, plate 403 is completely closed when the assembly is in a downward posture (see FIG. 12) and sitting upon circumferential shoulders 414, shown in FIG. 13. In other words, the range of travel between V1 completely closed and that of V1 completely opened as shown in FIGS. 12 and 13 respectively.

FIG. 14 is an enlarged view of the DAP and V2 and is generally similar to the view of FIG. 6. Therein it is to be appreciated that lower plate 431 of the V2 assembly remains closed until seal 433 is broken by downward force transmitted through axial rod 435. Conversely, the closure of V2 is complete when either the upper surface 446 of the V assembly has nested within recess 452 at the top of P2 (418) and/or seal 433 is re-made.

Within channel 430 are fluid turbulence control guides 438 and 440 which resemble the guides shown and described with reference to FIG. 7 above.

Figures 15, 16, 17:
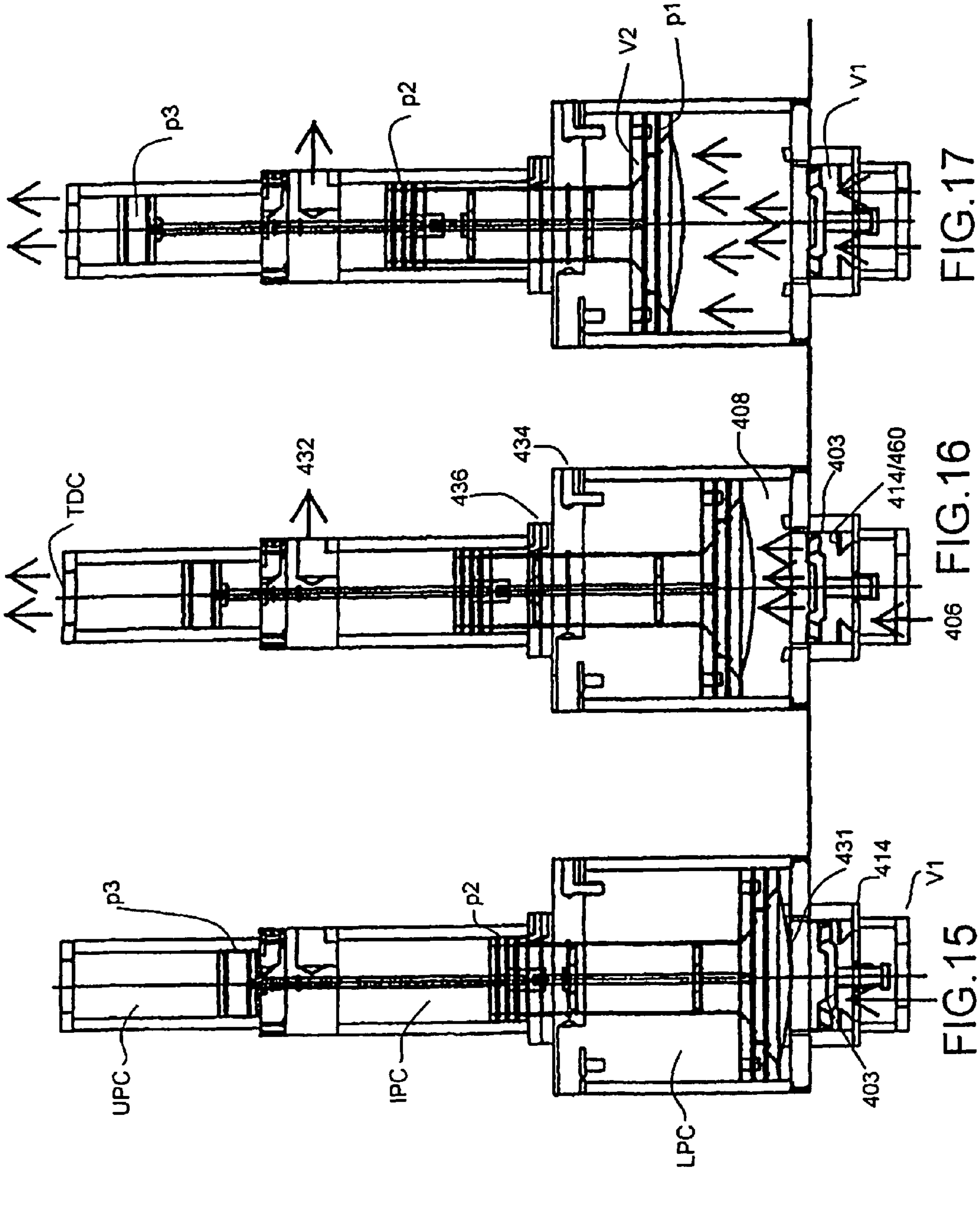
FIG. 15 is a schematic view of first sequence of operation of the embodiment of FIGS. 11-14.
FIG. 16 is a schematic view of a second sequence of operation of the fourth embodiment of the invention.
FIG. 17 is a schematic view of a third sequence of operation of thereof.
Figures 18, 19, 20:
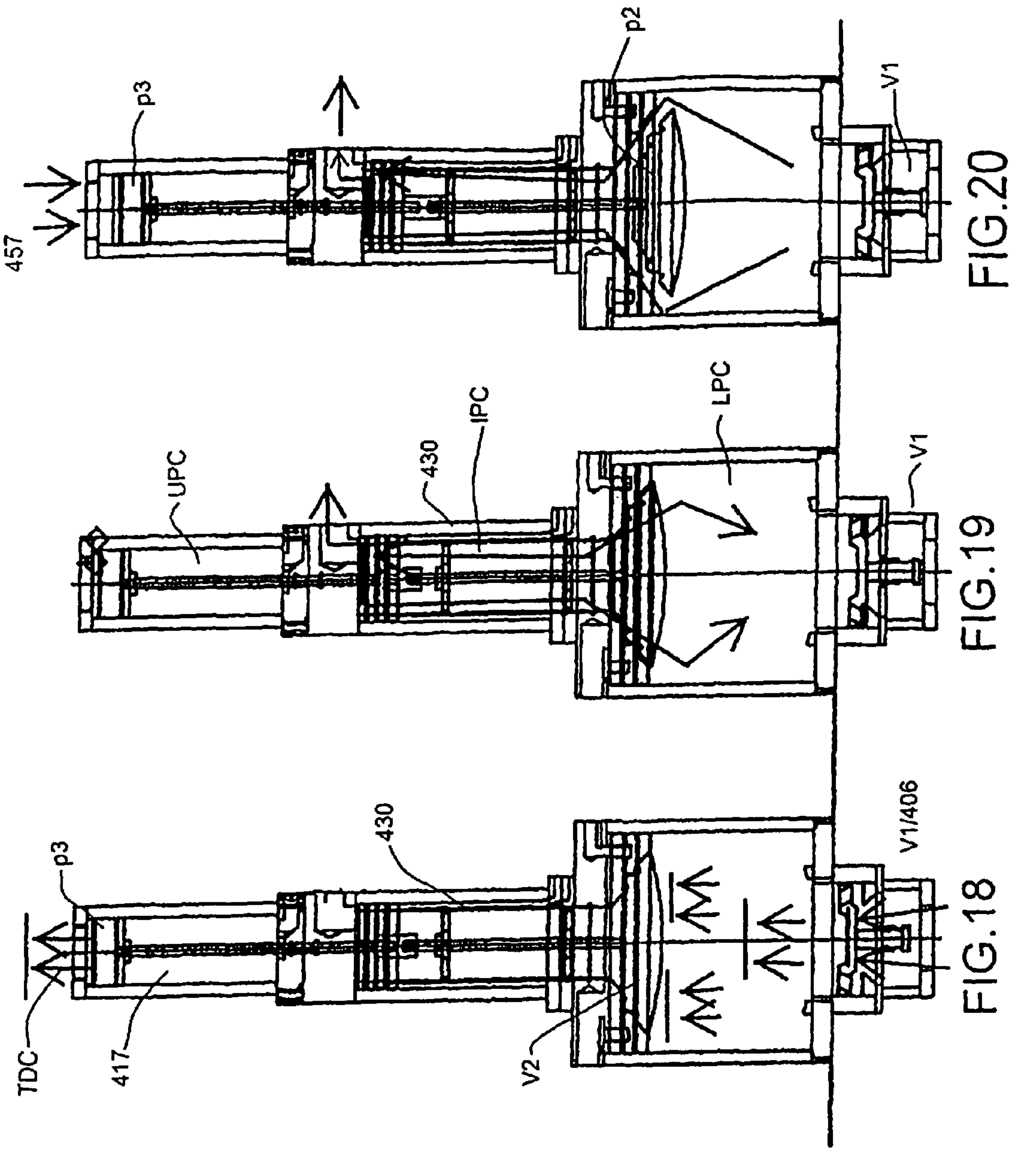
FIG. 18 is a schematic view of a fourth sequence of operation.
FIG. 19 is a schematic view of a fifth sequence of operation of the fourth embodiment.
FIG. 20 is a schematic view of a sixth sequence of operation of the present embodiment.
Figures 21, 22, 23:
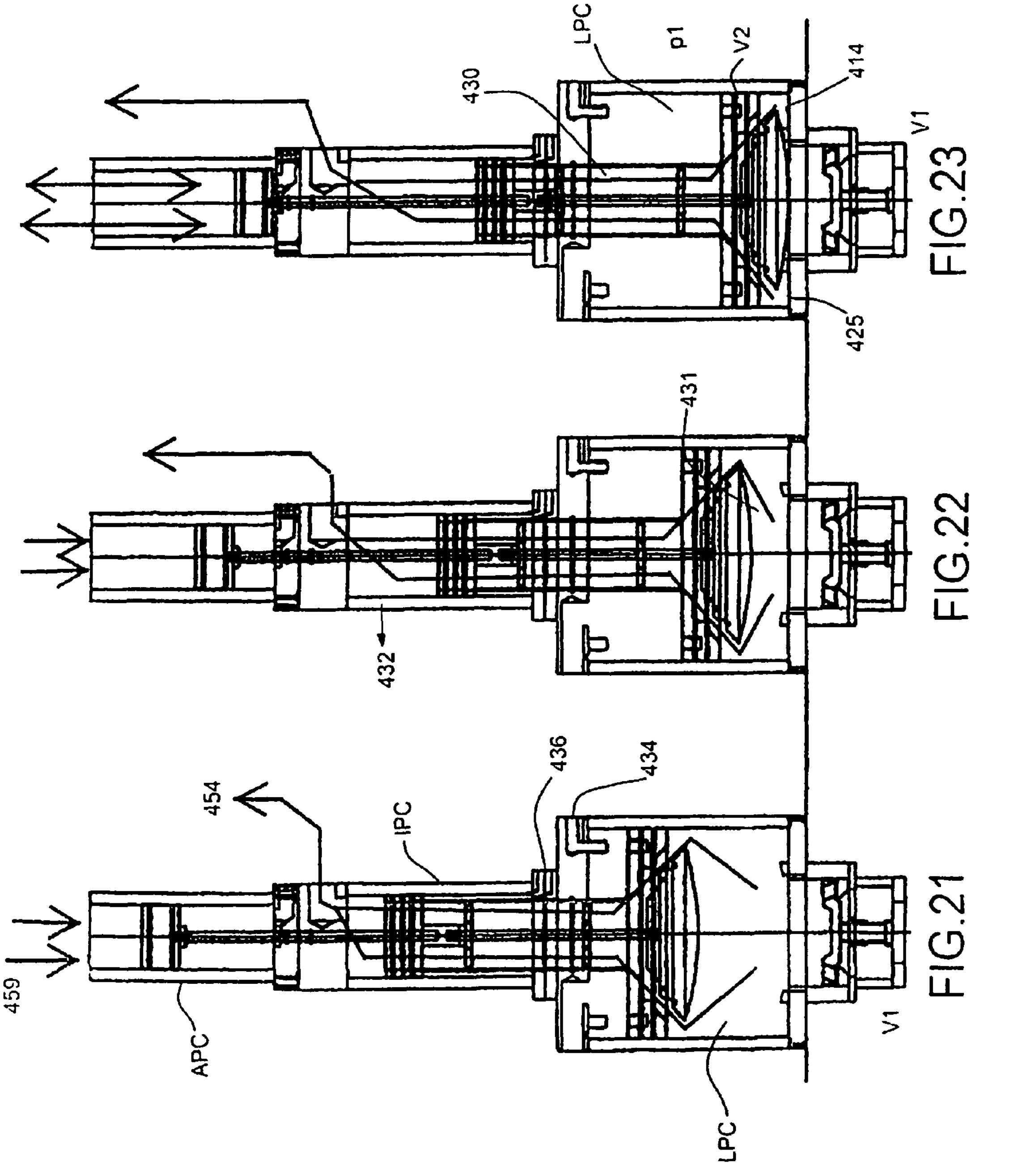
FIG. 21 is a schematic view of a seventh sequence of operation of the embodiment.
FIG. 22 is a schematic view of an eighth sequence of the operation of the fourth embodiment.
FIG. 23 is a schematic view of a ninth sequence of operation thereof.
Figure 24:
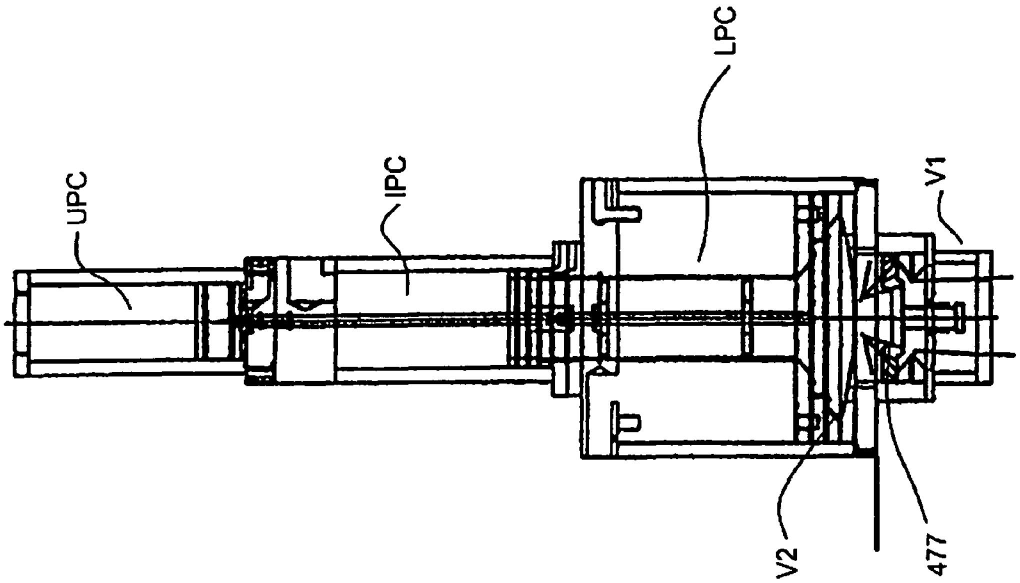
FIG. 24 is a schematic view of a tenth sequence of operation thereof showing the return of the internal assembly thereof to the position preceding the first sequence of FIG. 15.

With respect to the operation of the embodiment of unit 400, FIG. 15 shows the beginning of the sequence of operation indicative of the “at rest” position which occurs momentarily during each cycle. FIG. 15 may also be used as a reference or start point although the system will self-initialize at any step of its cycle and may be stopped at any cycle step through the creating of a “hydraulic lock.” As well, cycle speed may be regulated either through valve sizing, hydraulic pressure supplied at Ports 1 (406) and/or Port 6 (456) or through pneumatic restrictions at Ports 2 (434), 3 (436) or 5 (454). (See FIGS. 11 and 16).

At the point of FIG. 15, both V1 and V2 are closed, that is, the DAP piston assembly is the bottom of its stroke. Force action on the base 431 of V2 and V2 is closed through pistons P1 and P2, and the force from V1 P1 then begins opening if the V1 force surpasses that of pistons P2 and P3 in combination. Note V1 plate 403 is almost touching V1 shoulders 414.

At FIG. 16 (the second step of the sequence of operation of unit 400), V1 opens with an excess of force acting on the central aspect of the base 431 of the V2 assembly, this assisting a firm closure thereof. Resultantly, the entire DAP piston assembly is lifted up from the V2 sealing shoulders 414 and off of cradle 460 (see FIG. 13). As the piston assembly lifts from the sealing cradle, the base of piston P1 and remaining area V2 out of the cradle assembly 460 it is exposed to pressure of the fluid inflow from the pressure source through V1, effectively increasing the active surface area by about fifty percent and, thereby, the available force by the same factor. Such available force will now exceed 1000 pounds. [note, allowing a net pressure of 7 bar, ~100 psi the initial force is P2 face area of (10" dia–78.5"[ ]–7,850 lb lift against gravity vector—increasing to 18" dia–254"[ ]–25,400 lb force]

Thereafter, the piston in the V2 assembly, now an integral component of the DAP assembly, accelerates toward the TDC (top dead center) position of the system axis under force created by the in rush of hydraulic fluid through V1 into cylinder portion 408 (LPC). Therein, hydraulic fluid is expelled through Ports 4 (432) and 6 (456) (see FIG. 11) and 16 and may be used to perform work or may be stored as potential energy in an accumulator for later use. Pneumatic fluid is expelled from Port 2, (434) which may flow freely or be utilized in compression pneumatics applications of the invention. Concurrently, pneumatic fluid is drawn into ports 3 (436) and 5 (434) which may be left to free flow or to create a useful vacuum.

In a yet further alternative, Ports 2 (434), 3 (436) and 5 (454) may be used with pneumatic bi-directional power generators or other pneumatic equipment.

At Step 3 of the sequence of operation (shown in FIG. 17), maximum flow rate and piston velocities are achieved, and the system obtains a nominal or balanced state. At sequence 3, V1 is fully opened while V2 is fully closed. It is noted that piston speed has several determining factors, and is controlled by V1 pressure, V2 head maximum, restrictions on port sizes and apertures, loading on the outputs of any port, and the ratios of the functional areas of P1 to functional areas of other pistons acting in opposition thereto.

At sequence 4 (shown in FIG. 18) the piston assembly approaches TDC, the P3 (uppermost) piston reaches TDC slightly prior to that of the primary piston assembly, resulting in the opening of the V2 valve when it encounters a hard stop at the top of portion 417 of P3 (see also FIG. 11). As soon as V2 opens, a hydraulic circuit is enabled through the channel 430 inside the primary piston assembly (P1 and P2), thus enabling a reverse flow of hydraulic fluid through Port 1 (406).

With no pressure differential or force differential available, V1 will also begin to close. V1 is aided in this aspect by a combination of gravity and a momentary reverse flow through V2.

At sequence 5 of operation (see FIG. 19), the primary piston assembly is now fully at TDC. Therein V2 is about twenty percent open. V1 has been closed by gravity and hydraulic fluid flow, this effectively removing any potential of hydraulic fluid ingress from an external source or reservoir. The fluid channel conduit from the base of P1 to the crown of P2, that is, channel 43 as described above. Internal forces therein (excluding the weight of P3 and gravity) have been equalized. As such, the primary piston assembly P1, P2 and channel 430 are effectively a "free body" inside the cylinder assemblies. At sequence 5, the pressures in the entire system are equal, this at a pressure determined by conduit height of port 4 added to the pressure exerted by piston 3, but with no differential pressure across the DAP assembly.

Under Archimedean principles, the piston assembly is now free to sink through the fluid, displacing fluid in the lower chamber (UPC) and through the piston P1/P2 channel 430 and upper reservoir 485 (See FIG. 25), provided the balance of relative mass of the piston assembly is greater than that of the resistance of the hydraulic fluid and all combined seal pressures.

It is noted that theoretically there is no practical upper maximum to this displacement cycle of the system.

With reference to sequence 6 (see FIG. 20) the pressure 457 (operating alternatively to Port 6 (456) of FIG. 1) entering the system at the top of P3 is converted to a force which is applied compressively in the gravity vector and forces V2 fully open. As V2, when fully opened, makes a hard stop against the top of the primary piston 123 assembly, at recess 452 (see FIG. 14), a force is developed by pressure acting on piston 3 to be transposed to a force acting on the main piston assembly in the gravity vector, thereby ensuring a successful reset/displacement cycle and a satisfactory rate of the system. V1 remains closed.

In one example, the relative mass of the piston assembly is calculated at 180 pounds. However, the force generated through Piston 3 at 75 psi, over a 25 square inch area, will add a supplemental 1875 pounds, or about that of 10 times that of the gravity vector alone, yielding a total of downward force in excess of 2000 pounds, thus assuring re-opening of V2 and a successful displacement cycle.

In sequence 7 (see FIG. 21) the reset cycle is fully underway. Therein the unit is displaced in the hydraulic fluid in cylinder 1 (LPC) through the piston channel 430 into cylinder 2 (EPC) and the out of Port 4 (432) for either discharge to a receiving body to elevation required height for storage and use of the potential energy therein. Pneumatic conduits are shown as Port 2 (434) to withdraw pneumatic fluids and at Ports 3 (436) and 5 (454) which will both expel pneumatic fluid. Although technically feasible to extend energy from the pneumatic ports during the reset or displacement cycle, it is considered impractical to in that the integrity of the reset cycle is a requirement of functionality of the system. V1 remains closed.

In regard to sequence 8 (see FIG. 22), the reset or displacement cycle continues, with varying piston speeds, primarily determined by the hydrodynamics of the primary piston assembly, the hydraulic resistance of the conduits, the hydraulic resistance of the piping (not shown) from Port 4 (432) to a secondary collection point, and the hydrodynamics of the V2 face 431.

It is recommended that all porting internal to the system be maintained at a ratio of less than a 15:1 (piston surface area to port or conduit area). At ratios of less than 10:1 fluid retention times are minimized. V1 remains closed.

In regard to sequence 9 (see FIG. 23), the displacement cycle is completed and the V2 base is pressed against the V2 cradle 414 (see FIG. 12) at the base 425 of cylinder 1 (LPC) by the hydraulic pressure applied against the piston P1. When a seal is created by the force of closing and mating of those surfaces, the gravity vector propulsion thereof applied to V2 brings it to a hard stop. However, the channel 430 through V2 remains open and the piston P1 continues its travel down in the gravity vector with the force of gravity and inertia completing the cycle. V1 remains closed.

In reference to sequence 10 (see FIG. 24), the cycle also re-initiates with V2 being forced to close by a hydraulic pulse 477 entering through V1 using pressure and force differentials engineered at the cycle end of sequence 10. V1 begins to open. Sequence 1 (see FIG. 15) then follows as the next cycle begins.

Figure 25:
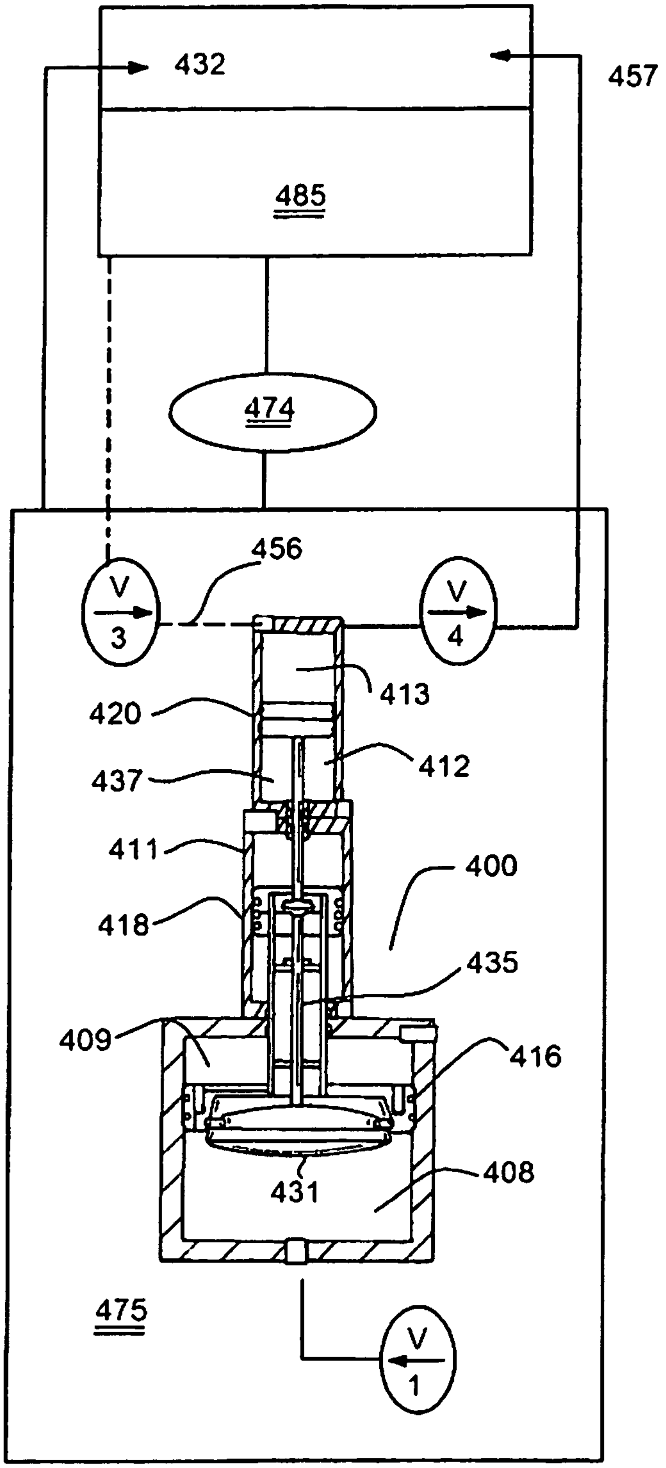
FIG. 25 is a schematic view of the system of FIGS. 11-24 shown in operation within a first reservoir providing a fluid pressure input at V1 and an upper fluid reservoir providing fluid pressure input to the upper cylinder of the system, said fluid pressure input to the upper cylinder capable of being alternatively derived from the same fluid source as that supplying V1 or any combination thereof.

With reference to the diagrammatic layout in FIG. 25, the assembly entire is shown immersed in a fluid body 475 which is of sufficient depth to create sufficient pressure and enable functionality. During operation fluid is forced under the pressure cycle (against the gravity vector) from above the uppermost piston 413 to an elevated reservoir or accumulator 485 through V4 in FIG. 25. This fluid may be stored in the reservoir 485 for supplemental use, added to the output of P4 (432 in FIG. 16) or utilized during the displacement-reset portion of the cycle by means of the conduit including V3 to provide additional pressure/force to the reset cycle. Alternatively it may simply be left as a completely open circuit without valving to the fluid body, noted as 406 in FIG. 16, thereby permitting multiple utilizations of the reset fluid, in which said fluid may be a fluid of a compressed pneumatic type.

Figure 26:
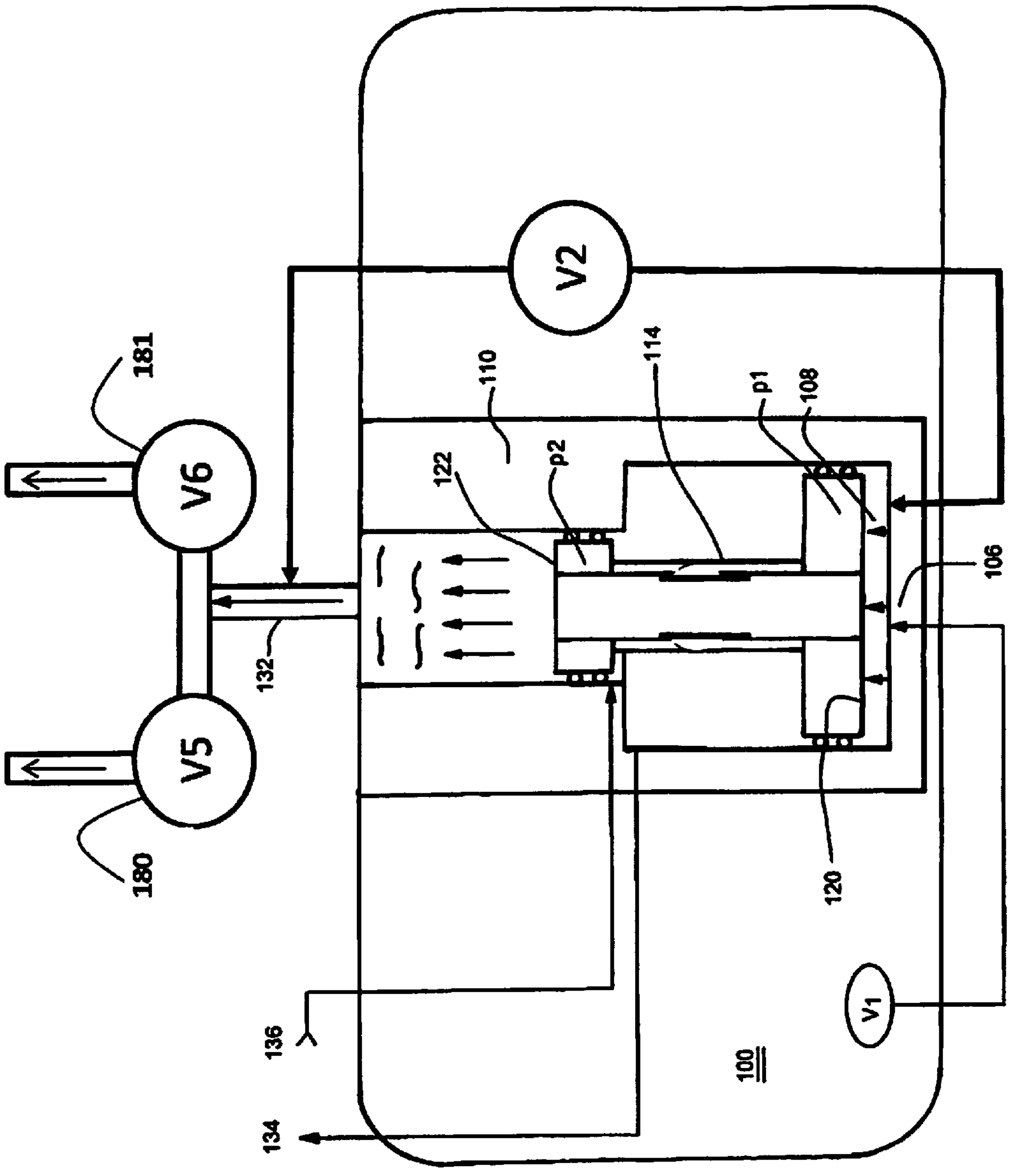
FIG. 26 is a schematic view of a further embodiment of FIGS. 1-4.

As shown in FIG. 26 valve V2 may be either internal to the conduit of the primary piston assembly 114/116/118 or external to it as is shown in FIG. 26, and controlled by end of stroke movements from the primary piston assembly 114/116/118 or may be directly controlled by the same end of stroke movements applying force in the form of a master/slave hydraulic valve to provide control to the V2 valve. The critical aspect of the V2 valve, in whatever embodiment, is the fact that it creates a fluid short circuit from cylinder chamber 108 to cylinder chamber 112.

Valves V5 and V6 in FIG. 26 enable the two disparate methods of fluid delivery, namely, pressure as applied through valve V1 when V1 is open, or displacement as applied under a reset cycle when valve V1 is closed, either of which can be independently utilized. Valves V5 and V6 would be normally open and normally closed respectively, operating and controlled by a single circuit, or independently, and controlled by end of stroke movements from the primary piston assembly 114/116/118, or by a commercially available sensing system, or may be directly controlled by the same end of stroke movements applying force in the form of a master/slave hydraulic valve to provide control to the V5/V6 valve system and thereby separate the two output types as and if required. The Valves V5 and V6 may be discrete items or combined within a single device commonly referred to as a "Y" valve.

Figure 27:
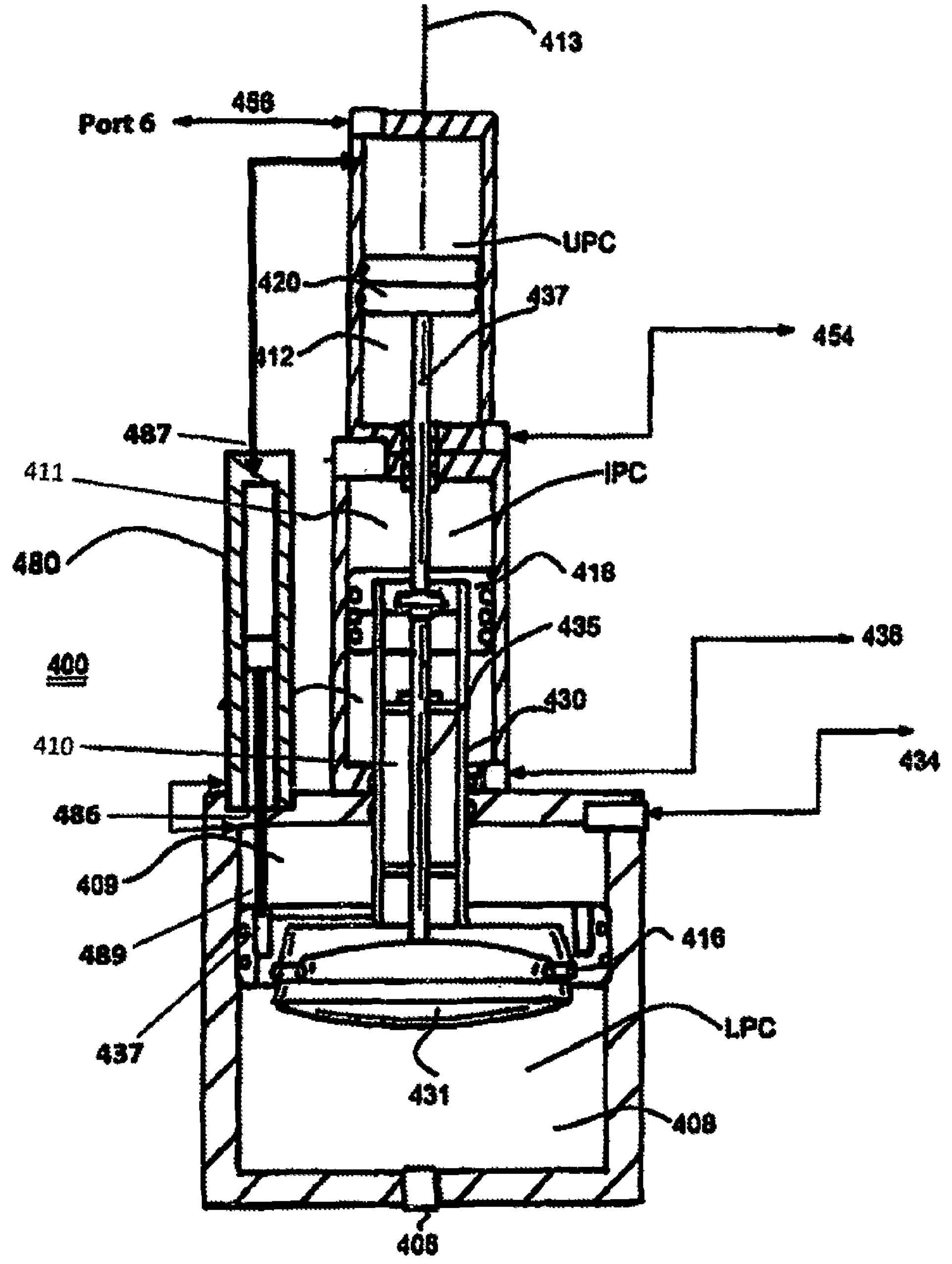
FIGS. 27 and 29 are schematic views of a further embodiment of the embodiment of FIGS. 15-24.

FIG. 27 demonstrates an auxiliary unit 480 for overcoming coefficient of friction ("CF") forces when utilizing the internal V2 valve in channel 430 set forth in FIGS. 14-24. Such CF forces may overcome the mass/gravity aspect of the return/reset cycle of the LPC piston 416. It is particularly useful in low pressure or low mass assemblies on the LPC piston 416, where the cycle rate may otherwise be impeded. Unit 480 may be installed as a single unit or a polar plurality of such units, and is a commercially available hydraulic or pneumatic cylinder/piston assembly, available from Bimba, Inc., in University Park, Ill. A lower port 486 of unit 480 communicates with air pressure lines or ports 434, 436 and 454. Unit 480 includes reciprocating rod 489 and contacts to surface 437 of LPC piston 416. Upper port 487 of unit 480 is fluidly connected to Line 454 through the UPC region.

It is also possible to utilize set pre-charged fluid mediums on the input port 487 of unit 480 from which force is derived, if desired. For example, unit 480 may simply derive its gravity vector force/pressure from the fluid at depth, if upper port 487 is connected to fluid pressure at depth or is connected to a pre-charged fluid reservoir, using a pressure regulated control to obtain ideal pressure regulation as desired.

Figure 28:
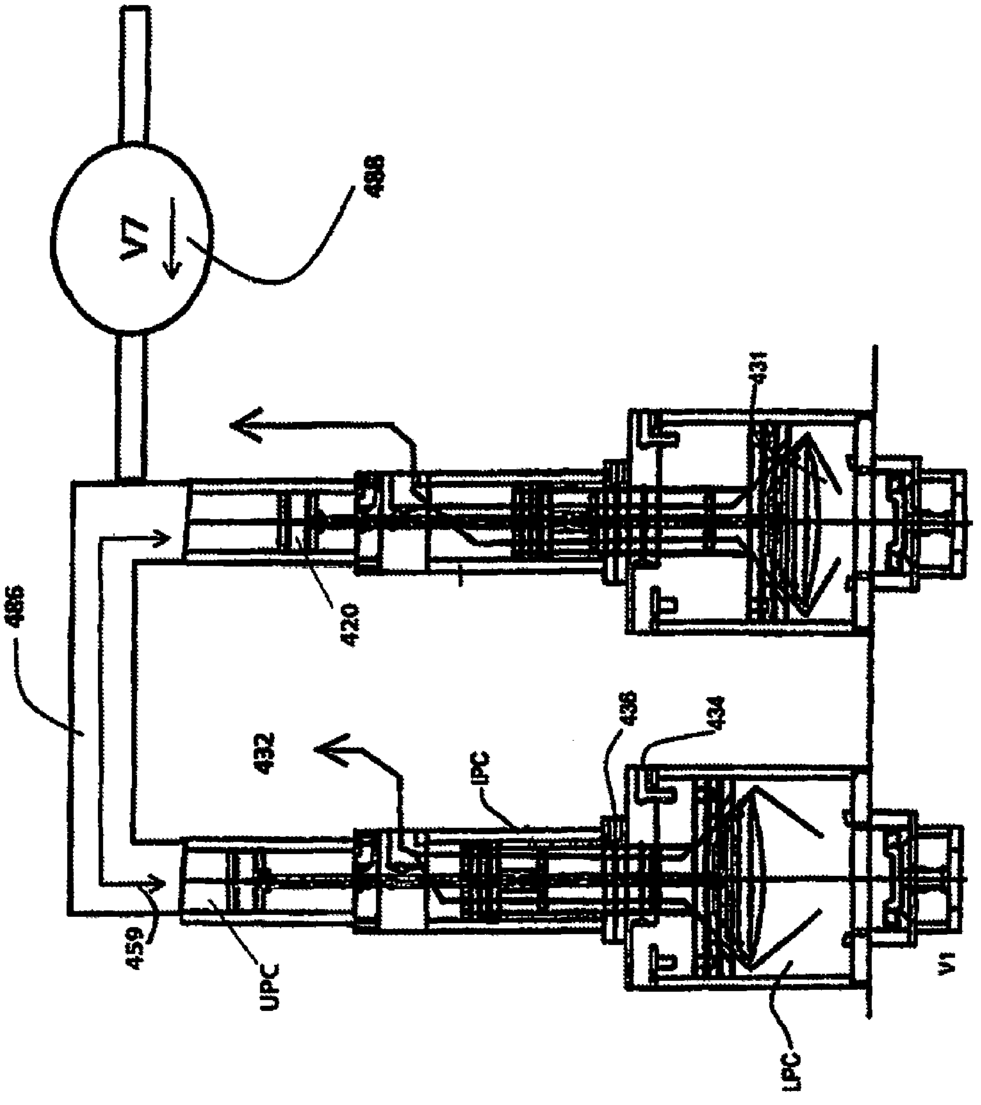
FIG. 28 is a schematic view of a further embodiment of FIGS. 15-24.

FIG. 28 demonstrates how, by connecting Port 6 (element 456 at top of FIG. 27) to another device of the same or similar type in a bi-directional fluid flow 486, supplemental pressure may be exerted upon the upper chamber UPC and piston assembly of each unit, thereby potentially greatly increasing the rate of reciprocation and providing even distribution of output as desired. V7 (element 488) is a conventional one-way valve, the purpose of which is to maintain the fluid level in the transfer conduit. V7 can be used at any location where sustenance of fluid levels is desired. The sum total force when utilizing an internal V2 valve acting with the gravity vector to create an opening force upon V2 shall not exceed the sum total force applied to the opposing aspect of V2, shown as the lower surface of element 431, which would maintain closure until internal pressure equalization. This rule does not apply with an external V2. It is noted that the force acting under the gravity vector directly upon P1, as applied by unit 480, shall not exceed the force applied in the gravity vector by piston head 420. While under operation opposing the gravity vector the force applied by pressure induced through V1 against the fluid contact surface of P1 shall not exceed that provided against the surface 431 minus the force applied through piston head 420 after allowance for the coefficients of friction is made, as created between the piston assembly and the housings of the system. See FIGS. 27 and 29.

Figure 29:
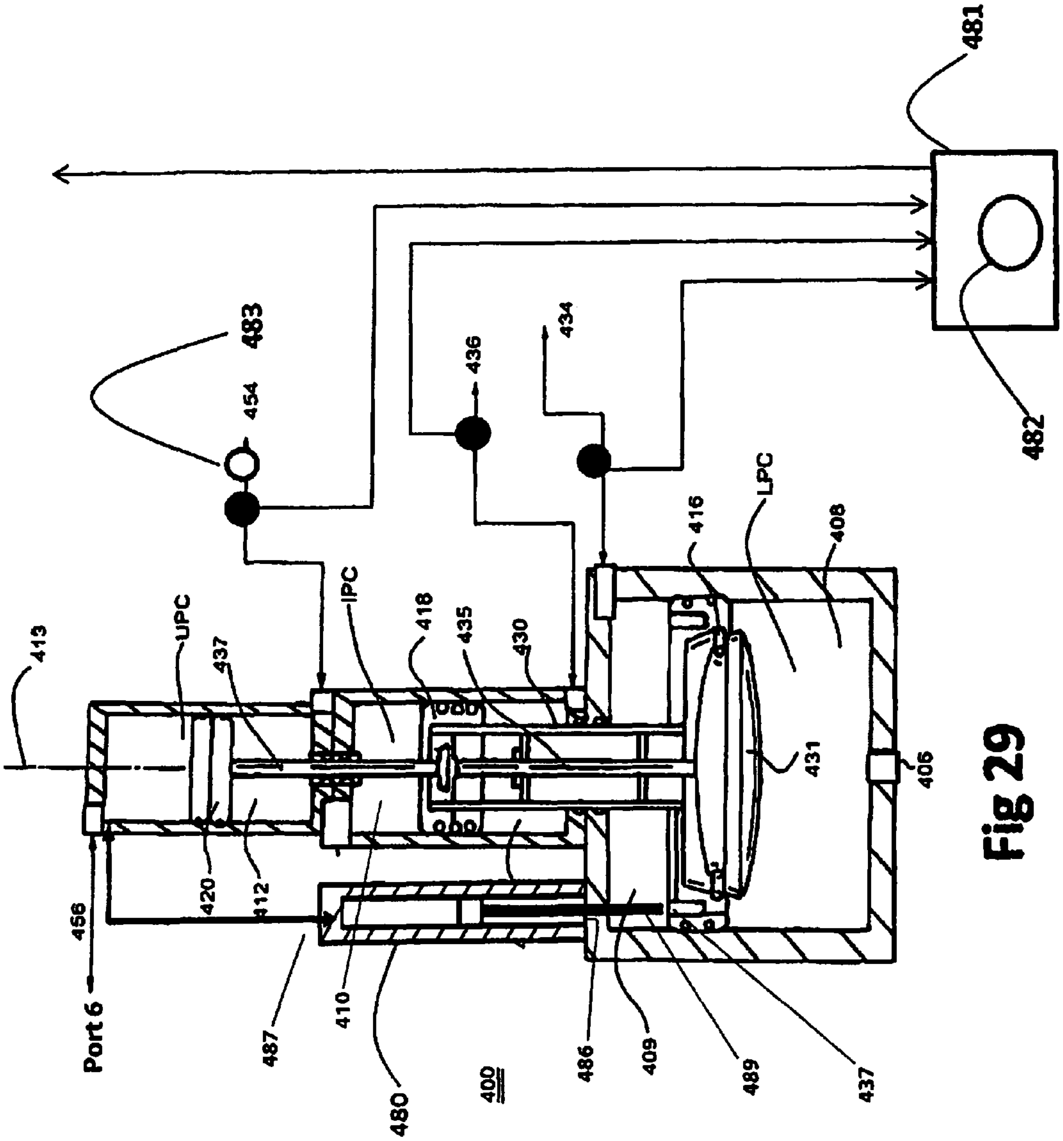

FIG. 29 demonstrates an external method of capturing any fluid gathering in the low pressure fluid chambers 409/410/412 through normal operational leakage and draining it externally to a collector unit, thereafter expelling it from the system by either conventional pumping methods, or by utilizing a secondary pump as is described below. Alternatively, at point 483 the fluid may simply be elevated after compression during which it may be designed to be atomized or pressure extracted under the cycle with the flow of low density fluid through ports 434/436/454 and prevented from returning by way of commercially available and existing check valves at point 483. See also FIGS. 11 and 16.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

We claim:

1. A differential fluid pressure energy conversion system, comprising:

(a) a valve (V1) for regulating an input from a pressure source to define a fluid flow;

(b) a lower piston chamber (LPC) in fluid communication with an output of said V1, said LPC disposed about a central vertical axis of said system;

(c) a double acting reciprocatable piston (DAP) having an integral lower portion (PI) and an integral upper integral portion (P2), each portion having a bottom radial surface area, the radial surface area of P1 greater than that of said P2, an outer peripheral edge of said P1 in fluid-tight slidable continuous contact with an inner complemental surface of said LPC, said DAP further including an elongate axial channel, co-axial with said vertical axis of the system, said channel extending an entire axial length of said DAP;

(d) an upper piston chamber (UPC) disposed in vertical axial alignment with said system axis and without fluid communication with said LPC, an inner surface of said UPC in fluid-tight slidable continuous contact with a complemental peripheral edge of said P2 of said DAP;

(e) a valve (V2) within said axial channel of said DAP, said valve effecting closure of said channel during each upstroke of said DAP and opening of said axial channel during each downstroke of said DAP;

(f) a fluid exit port in fluid communication with said UPC disposed above a greatest extent of upward travel of said DAP, said port permitting release therethrough, to an ambient atmosphere, during upward axial displacement of the DAP, of pressurized fluid injected through said axial channel into said UPC during downward axial displacement of said DAP when said valve V2 is open;

(g) a conduit having said fluid flow therethrough at pressure established by said pressure source, said source having a pressure greater than that of said ambient atmosphere, said conduit comprising an input to said V1; and (h) a primary reservoir surrounding said LPC and UPC, providing said pressure source to said conduit at said V1 at an established depth within said reservoir, whereby a ratio of pressure of said fluid in said UPC relative to that in said LPC is generally determined by the ratio of said lower radial surface area of P1 to that of said P2.

2. The system as recited in claim 1 in which said P1 and P2 each define a substantially cylindrical geometry, an outer edge of P1 outwardly concentric to that of P2.

3. The system as recited as recited in claim 1, further comprising:

(h) a piston chamber (IPC) located intermedially between said UPC and said LPC; and (i) a radial conduit exterior of IPC carrying a second fluid, different from said fluid of claim 1, said second fluid, when released into said IPC, subjected to compressive forces from an upper surface of P1 against said IPC, to effect reciprocating pressure cycle strokes against said second fluid, causing cyclical pressurized discharge thereof from said IPC to said exterior conduit.

4. The system as recited in claim 1, in which fluid ejected from said fluid exit port of the UPC is returned to said pressure source, after work has been extracted therefrom.

5. The system as recited in claim 1, further comprising a secondary reservoir disposed gravimetrically above and discrete from said primary reservoir.

6. The system as recited in claim 1, in which said V2 comprises a mass sufficient to effect a re-set of said DAP when V2 is open.

7. The system as recited in claim 1, further comprising:

a fluid accumulator located downstream of said fluid exit port.

8. The system as recited in claim 1, further comprising:

a pneumatic pressure line in fluid communication with said LPC above the location of said P1 therein.

9. The system as recited in claim 1, further comprising:

a pneumatic suction line in fluid communication with said UPC below the location of said P2 therein.

10. The system as recited in claim 1 in which P1 and P2 each define an elliptical geometry, an outer edge of P1 outwardly concentric to that of P2.

11. The system as recited in claim 1 in which an output of said fluid exit port comprises an input to a compressor.

12. The system as recited in claim 1, in which an output of said fluid exit port comprises an input to a turbine, reservoir or accumulator.

13. A differential fluid pressure energy conversion system, comprising:

(a) a lower pressure chamber (LPC) including, in a lower region thereof, a valve (V1) for regulating fluid input to said LPC from a defined pressure source having a pressure greater than that of an ambient atmosphere, said LPC disposed in axial alignment about a central vertical axis of said system including an upper base of said LPC disposed about said system axis;

(b) an intermediate piston chamber (IPC) disposed in vertical axial alignment with the system axis and having fluid communication with said LPC through an opening in a lower base of said IPC disposed oppositely an opening in an aperture in said upper base of said LPC;

(c) an upper piston chamber (UPC) disposed in vertical axial alignment with the system axis, a lower base of said UPC having an aperture therein opposing an aperture in an upper base of said IPC;

(d) a double-acting reciprocatable piston (DAP) having an integral lower piston head (P1), operable within said LPC, an integral intermediate piston head (P2) operable within said IPC, and an integral upper piston head (P3) operable within said UPC, each of said P1, P2 and P3 having a lower radial surface area in which an aggregate lower radial surface area of P1 is greater than that of an aggregate lower surface area of P2 and P3 combined, an outer peripheral edge of each of P1, P2 and P3 in fluid-tight slidable continuous contact with inner complemental surfaces of said LPC, IPC and UPC respectively, lower and intermediate portions of said DAP including an axial channel having an elongate axial rod co-axial with said vertical axis of the system, said channel and rod extending between said LPC and said IPC, a downwardly directed flared opening of said axial channel located within said P1 and having a diameter greater than that of upper portions of said axial channel within and between said LPC and IPC;

(e) a valve (V2) within said axial channel of said DAP, said valve effecting selectable closure of said channel, inclusive of said flared opening, during each upstroke of said DAP, and opening said axial channel during each downstroke of said DAP, said V2 integrally including said axial rod within said axial channel;

(f) a fluid exit port in fluid communication with said IPC disposed above a greatest extent of travel of said DAP, said port permitting release therethrough, to said ambient atmosphere, during upward axial displacement of said DAP, of pressurized fluid injected through said axial channel into said IPC during downward axial displacement of said DAP, whereby the ratio of pressure of said fluid in said IPC relative to that in said LPC is generally determined by the ratio of a lower radial surface area of P1 to that of P2.

14. The system as recited in claim 13, further comprising:

a conduit having said fluid flow therethrough at a pressure established by said pressure source, said pressure greater than that of said ambient atmosphere, said conduit comprising an input to said V1.

15. The system as recited in claim 14, further comprising:

a primary reservoir surrounding said LPC, IPC and UPC, providing said pressure source within said conduit, said input at V1 at an established depth of said reservoir.

16. The system as recited in claim 13, in which an upper portion of said UPC located above a greatest upward extent of travel of said P3 defines a port in fluid communication with said pressure source to assist in a reset function of V2 when opening during each downstroke of the DAP.

17. The system as recited in claim 16, in which said fluid port of said UPC is in fluid communication with said primary reservoir surrounding said system.

18. The system as recited in claim 16, in which said fluid port of said UPC is in fluid communication with an upper reservoir above said lower reservoir to assist said V2 in effecting downstrokes of said DAP.

19. The system as recited in claim 13, said fluid exit port comprising an input to a fluid accumulator located downstream of said exit port of said IPC.

20. The system as recited in claim 13, said fluid exit port comprising an input to compressor located downstream of said exit port of said IPC.

21. The system as recited in claim 13, said fluid exit port comprising an input to a turbine located downstream of said exit port of said IPC.

22. The system as recited in claim 13, in which said downwardly directed flared opening of said axial channel within said LPC defines a recess within P1 generally complemental in geometry to a closure plate of V2 secured to a bottom of said axial rod and at an opening to said axial channel within.

23. The system as recited in claim 22, in which an upper portion of said UPC located above a greatest upward extent of travel of said P3 defines a port in fluid communication with said pressure source to assist in a reset function of V2 when opening during each downstroke of the DAP.

24. The system as recited in claim 23, in which said fluid port of said UPC is in fluid communication with an upper reservoir gravimetrically above and discrete from said lower reservoir to assist said V2 in effecting downstrokes of said DAP.

25. The system as recited in claim 22, in which V1, at a part thereof within a lower portion of LPC, defines a cage for moderating a rate of inflow of water from V1.

26. The system as recited in claim 13, in which V1 is disposed along the vertical system axis.

27. The system as recited in claim 22, in which said exit port of said IPC is in fluid communication with an upper reservoir gravimetrically above and discrete from said lower reservoir providing a pressure source to V1.

28. The system as recited in claim 27, is which said upper reservoir includes an output to a fluid-turbine.

29. The system as recited in claim 13, further including:

at least one auxiliary piston assembly having an assembly cylinder input in fluid communication with said UPC, or other available pressurized source, and a reciprocating piston output of said assembly in mechanical communication with an upper surface of said lower piston head (P1) of said DAP.

30. The system as recited in claim 29, in which said auxiliary piston assembly comprises a plurality of preferably equi-spaced piston assemblies as optimally required to achieve a desired functional result.

* * * * *